United States Patent
Avudainayagam et al.

(10) Patent No.: US 9,231,736 B2
(45) Date of Patent: Jan. 5, 2016

(54) OPTIMIZING RESPONSE INTERFRAME SPACE IN COMMUNICATION SYSTEMS

(71) Applicant: QUALCOMM Incorporated, San Diego, CA (US)

(72) Inventors: Arun Avudainayagam, Gainesville, FL (US); Ehab Tahir, Mississauga (CA)

(73) Assignee: QUALCOMM Incorporated, San Diego, CA (US)

(*) Notice: Subject to any disclaimer, the term of this patent is extended or adjusted under 35 U.S.C. 154(b) by 71 days.

(21) Appl. No.: 14/085,527

(22) Filed: Nov. 20, 2013

(65) Prior Publication Data

US 2015/0138999 A1 May 21, 2015

(51) Int. Cl.

| | | |
|---|---|---|
| *G01R 31/08* | (2006.01) | |
| *G06F 11/00* | (2006.01) | |
| *G08C 15/00* | (2006.01) | |
| *H04L 1/16* | (2006.01) | |
| *H04L 1/00* | (2006.01) | |
| *H04L 1/18* | (2006.01) | |
| *H04L 12/413* | (2006.01) | |
| *H04L 5/00* | (2006.01) | |
| *H04L 27/26* | (2006.01) | |

(52) U.S. Cl.
CPC .............. *H04L 1/1607* (2013.01); *H04L 1/005* (2013.01); *H04L 1/0042* (2013.01); *H04L 1/1854* (2013.01); *H04L 12/413* (2013.01); *H04L 1/1628* (2013.01); *H04L 5/0007* (2013.01); *H04L 27/2646* (2013.01)

(58) Field of Classification Search
CPC .................... H04L 12/413; H04W 74/0808
See application file for complete search history.

(56) References Cited

U.S. PATENT DOCUMENTS

| 6,671,284 B1 | 12/2003 | Yonge, III et al. |
| 7,263,105 B2 | 8/2007 | Trainin |
| 7,668,102 B2 | 2/2010 | Li et al. |
| 7,907,614 B2 | 3/2011 | Fischer et al. |

(Continued)

FOREIGN PATENT DOCUMENTS

| WO | 2015077128 | 5/2015 |
| WO | 2015077204 | 5/2015 |

OTHER PUBLICATIONS

M.K.Lee et al. (Home plug 1.0 Powerline Communication LANs-Protocol Description and performance result, version 5.4, revised Sep. 18, 2002).*
Co-pending U.S. Appl. No. 14/085,853, filed Nov. 20, 2013, 52 pages.
"International Application No. PCT/US2014/065534 International Search Report and Written Opinion", Mar. 3, 2015, 15 pages.

(Continued)

*Primary Examiner* — Maharishi Khirodhar
(74) *Attorney, Agent, or Firm* — DeLizio Law, PLLC

(57) ABSTRACT

A response interframe space (RIFS) time period may be adapted in a communication system. The RIFS time period may be determined based, at least in part, on a processing time used by a receiving device to process a received physical layer transmission from a transmitting device. The RIFS may be optimized in consideration of channel conditions for a particular communications channel, capabilities of a receiving device, and/or characteristics of a particular physical layer transmission. For example, the RIFS may be dependent on characteristics of a final transmission symbol used to transmit a physical layer transmission. The RIFS may depend on a processing time associated with decoding forward error correction (FEC) encoded blocks that end in the final transmission symbol. The RIFS may depend on a quantity of decoding iterations in a communication system that uses iterative decoding of FEC encoded blocks.

30 Claims, 17 Drawing Sheets

(56) References Cited

U.S. PATENT DOCUMENTS

| | | | |
|---|---|---|---|
| 8,116,290 | B2 | 2/2012 | Moorti et al. |
| 8,493,995 | B2 | 7/2013 | Krishnam et al. |
| 2007/0171933 | A1 | 7/2007 | Sammour et al. |
| 2011/0268161 | A1* | 11/2011 | Yonge et al. ............... 375/211 |
| 2011/0280332 | A1* | 11/2011 | Yonge, III ............. H04L 12/413 375/288 |
| 2012/0320931 | A1* | 12/2012 | Vedantham et al. .......... 370/445 |
| 2013/0287040 | A1 | 10/2013 | Katar et al. |
| 2015/0139248 | A1 | 5/2015 | Katar et al. |

OTHER PUBLICATIONS

"PCT Application No. PCT/US2014/066065 International Search Report", Feb. 26, 2015, 12 pages.

Convertino, et al., "An Adaptive FEC Scheme to Reduce Bursty Losses in a 802.11 Network", Global Telecommunications Conference. 2006, GLOBECOM '06, IEEE, IEEE. PI, Nov. 1, 2006, pp. 1-6.

Geldmacher, et al., "Hard decision based low SNR early termination for LTE Turbo decoding", Wireless Communication Systems (ISWCS),2011 8th International Symposium on, IEEE Nov. 6, 2011, pp. 26-30.

* cited by examiner

| Channel Conditions | Poor quality channel | Good quality channel |
| --- | --- | --- |
| Data Rate | Lower | Higher |
| Number of PBs in last modulation symbol | Less | More |
| Number of iterations required to successfully decode and verify PB | More | Less |
| Adjustment to RIFS | Possible increase to RIFS if the PBs in the last symbol need more iterations | Possible decrease to RIFS if the PBs in the last symbol need fewer iterations |

FIG. 5

OPTIMIZING RESPONSE INTERFRAME SPACE IN COMMUNICATION SYSTEMS

TECHNICAL FIELD

Embodiments of the disclosed subject matter generally relate to the field of communication systems, and, more particularly, to a response interframe space between a first transmission and an acknowledgment message.

BACKGROUND

Communication systems may utilize a communication protocol which defines how information is communicated from a first device to a second device via a communications medium. The communications medium may be wired or wireless and may be associated with a physical layer protocol. Upper layer data (such as a media access control, MAC, layer data) may be divided, encapsulated, segmented, encoded and/or encrypted by the physical layer protocol to prepare a physical layer transmission. The physical layer transmission may be communicated via the communications medium from the first device (e.g., a transmitting device) to the second device (e.g., receiving device). An acknowledgement scheme may be used such that the second device can indicate whether the second device has successfully received one or more portions of the physical layer transmission. The acknowledgement may be sent from the second device as soon as practical after receiving the each physical layer transmission or after receiving a series of physical layer transmission.

A response interframe space (referred to as Response Interframe Space, or RIFS) is a time period following physical layer transmission during which the first and second devices refrain from transmitting on the communications medium. The RIFS time period may be used by the second device to process the physical layer transmission and generate an acknowledgment message. Because no packet transmission occurs during the RIFS time period, the communications medium is idle. As such, the RIFS time period may be considered overhead for the communication system. Conventional communication systems may define the RIFS based on a standardized time period so that the various devices that use the communications medium utilize the same RIFS as a fixed value. In some communication systems, the RIFS may be a predefined system parameter based on the network technology associated with the communication system.

SUMMARY

Various embodiments are described for determining a response interframe space (RIFS) in a communication system. The RIFS may be based at least in part on a processing time associated with decoding a physical layer transmission at a receiver. The receiver may determine a processing time associated with iteratively decoding forward error correction (FEC) encoded physical layer transmissions. The RIFS may be adjusted based, at least in part, on a number of decoding iterations used to decode a final portion of a physical layer transmission. The RIFS may also be optimized for different channel conditions and data transmission rates.

In one embodiment, a device receives a physical layer (PHY) protocol data unit (PPDU) that includes multiple FEC encoded blocks (also referred to as FEC blocks). The PPDU is received as a series of modulation symbols. The device determines the RIFS based at least in part on a processing time associated with processing a final modulation symbol of the PPDU. The RIFS defines a RIFS time period after a final modulation symbol of the PPDU and before sending an acknowledgment message. The device sends the acknowledgment message responsive to receiving the PPDU after the RIFS time period associated with the RIFS.

In various embodiments, the RIFS based at least in part on the processing time may vary based, at least in part, on channel conditions, forward error correction coding scheme, acknowledgment message generation time, or a number of iterations of decoding that will be performed for each FEC encoded block that ends in the final modulation symbol.

BRIEF DESCRIPTION OF THE DRAWINGS

The present embodiments may be better understood, and numerous objects, features, and advantages made apparent to those skilled in the art by referencing the accompanying drawings.

FIG. 5 depicts a table illustrating two scenarios in which a response interframe space may be adapted based on channel conditions in accordance with an embodiment of this disclosure.

DESCRIPTION OF EMBODIMENT(S)

The description that follows includes exemplary systems, methods, techniques, instruction sequences and computer program products that embody techniques of the present subject matter. However, it is understood that the described embodiments may be practiced without these specific details. In other instances, well-known instruction instances, protocols, structures and techniques have not been shown in detail in order not to obfuscate the description.

The RIFS constitutes an overhead to communication. A system-wide preconfigured RIFS time period may be unnecessarily long and may reduce overall throughput. A system-wide preconfigured RIFS time period that is too short may inhibit the receiving device from processing the physical layer transmission and preparing an acknowledgment message. Communication systems may benefit from keeping the RIFS as small as possible, but long enough for a receiver to complete decoding operations. Adapting the RIFS for particular transmissions and/or devices may result in a more efficient use of the communications medium.

In accordance with this disclosure, a RIFS time period may be adapted in a communication system. The RIFS time period may be determined based, at least in part, on a processing time used by a receiving device to process a received physical layer transmission from a transmitting device. The RIFS time period may be different than a standardized preconfigured system parameter. As such, the RIFS may be optimized in consideration of channel conditions for a particular communications channel, capabilities of a receiving device, and/or characteristics of a particular physical layer transmission. For example, the RIFS may be dependent on characteristics of a final transmission symbol used to transmit a physical layer transmission. The RIFS may depend on a processing time associated with decoding FEC encoded blocks that end in the final transmission symbol.

In another embodiment, the RIFS may be dependent on channel conditions. For example, the channel conditions may be determined based on a channel estimation process, a data rate of the transmission, or a history of previous decoding operations associated with other transmissions received from the same transmitting device. The present disclosure also provides embodiments for optimizing the RIFS time period based at least in part on a relationship between channel conditions and the processing time used to iteratively decode the FEC encoded blocks that end in a final transmission symbol. The RIFS time period may be increased for poor channels so that more decoding iterations may be performed to properly decode all the FEC encoded blocks that end in the final transmission symbol of a PPDU. On good channels, fewer decoding iterations may be needed. Therefore, the RIFS may be decreased to reduce unnecessary overhead.

Figure 1:
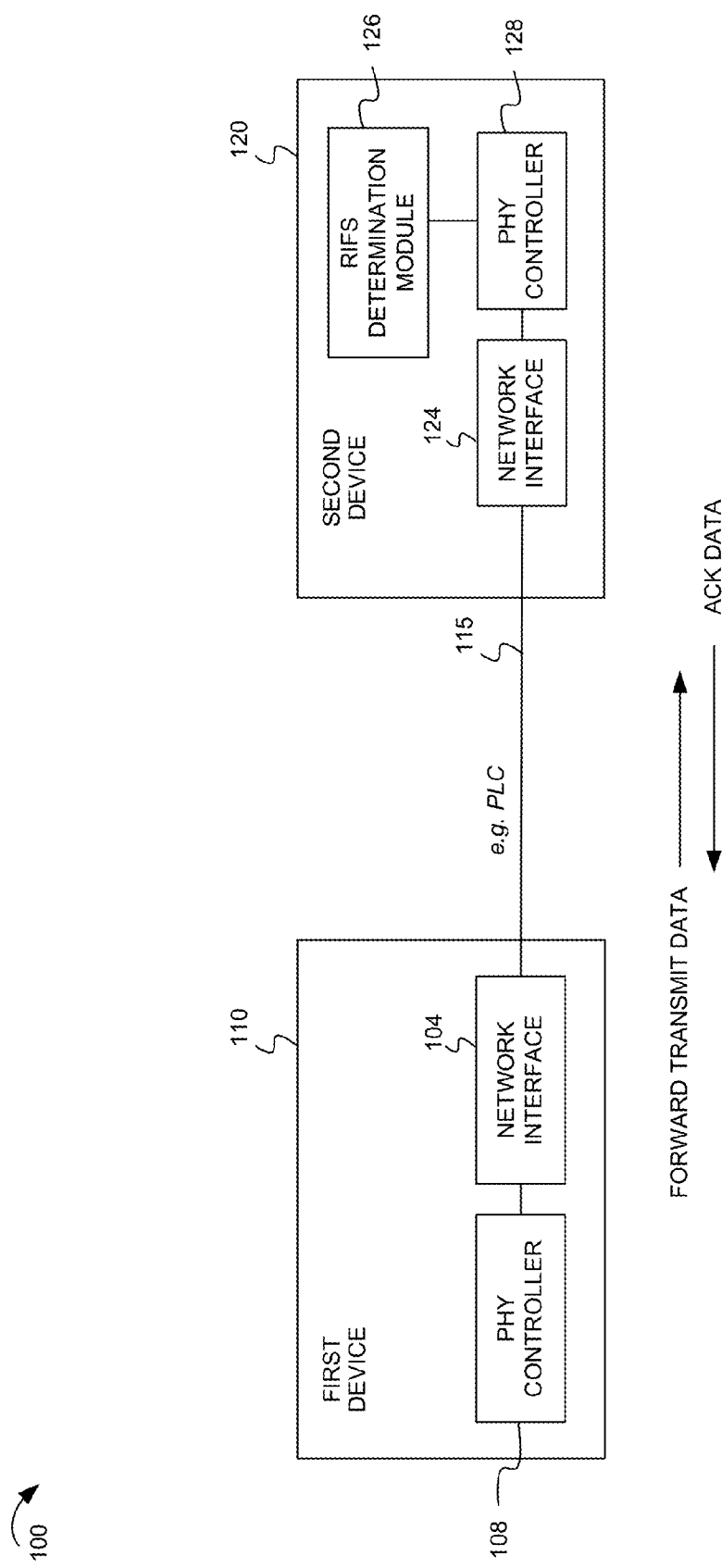
FIG. 1 depicts an example communication system in accordance with an embodiment of this disclosure.

FIG. 1 depicts an example communication system 100 in which various embodiments of this disclosure may be introduced. The example communication system 100 includes a first device 110 and a second device 120. The first device 110 may comprise a PHY controller 108 and network interface 104. The network interface 104 may include a transceiver (or separate transmitter and receiver components) for transmitting and receiving communications via a communications medium 115. The PHY controller 108 may control the network interface 104 and manage settings, such as RIFS, modulation and coding scheme, acknowledgement scheme, or other configurations used by the network interface 104 to communicate with a corresponding network interface 124 at the second device 120. Network interface 104 may be coupled to the communications medium 115. The network interface 124 is also coupled to the communications medium 115. In the example communication system 100, the communications medium 115 may be a powerline communications (PLC) medium. However, the communications medium 115 may be other types of communications medium, and may be wired or wireless in various alternative implementations. Similar to the first device 110, the second device 120 may include a PHY controller 128.

The second device 120 may also include a RIFS determination module 126 configured to implement various features of this disclosure. The RIFS determination module 126 may determine the RIFS based, at least in part, on a processing time used by the second device 120 to process a physical layer transmission from the first device 110. A variety of factors may be used to determine the RIFS, such as the factors described in FIG. 4.

In the example communication system 100, the first device 110 may be referred to as a transmitting device and the second device 120 may be referred to as a receiving device. The first device 110 may transmit data in the "forward" direction, thus the data may be referred to as forward transmit data. The first device 110 may transmit the forward transmit data as a physical layer transmission via the communications medium 115 to the second device 120. The second device 120 receives the physical layer transmission and attempts to decode the physical layer transmission. In accordance with an acknowledgement scheme, the second device 120 may prepare an acknowledgment message to indicate whether the second device 120 has successfully decoded all or part of the physical layer transmission.

The first device 110 and second device 120 may maintain a timing synchronization for communications. Therefore, both the first device 110 and second device 120 may be aware of a RIFS time period. The RIFS time period defines a time period between a completion of the physical layer transmission (the forward transmit data) from the first device 110 to the second device 120 and an acknowledgment message from the second device 120 to the first device 110. The RIFS represents an idle time on the communications medium 115 during which neither the first device 110 nor the second device 120 may communicate. In accordance with an embodiment this disclosure, the RIFS determination module 126 may determine the RIFS. The first device 110 may also have a RIFS determination module (not shown).

In one embodiment, the RIFS determination module 126 may determine the RIFS prior to receiving the physical layer transmission from first device 110 and may communicate the RIFS to the first device 110 in a management message, control message, or configuration message so that both the first device 110 and second device 120 are aware of the RIFS time period. In another embodiment, the second device 120 may communicate parameters for determining the RIFS so that the first device 110 may independently determine the RIFS using a same algorithm and parameters as the second device 120. After the RIFS time period, the second device 120 may send the acknowledgment message to the first device 110.

Figure 2:
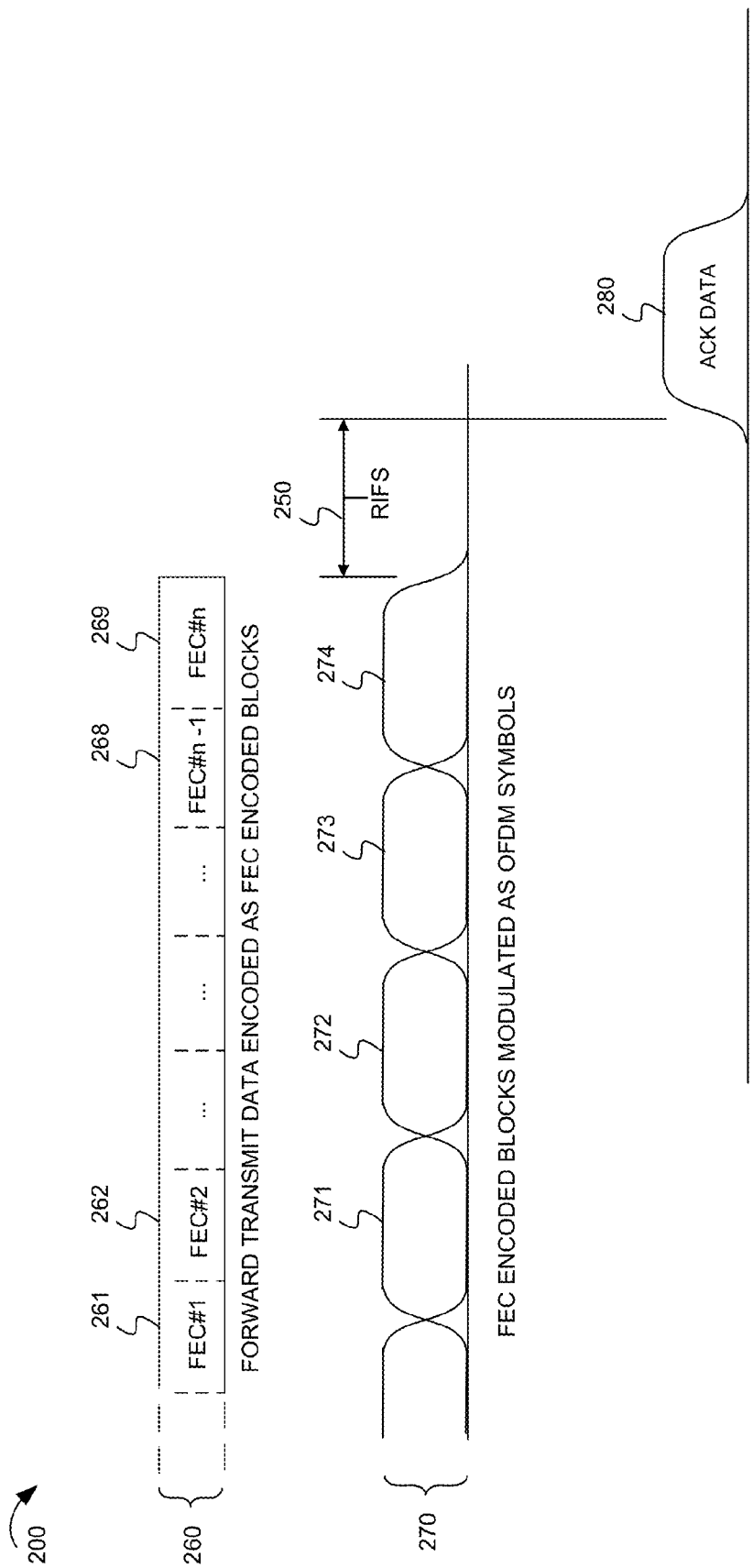
FIG. 2 depicts a relationship between forward transmit data, a response interframe space, and an acknowledgment message in accordance with an embodiment of this disclosure.

FIG. 2 depicts an illustration 200 showing a relationship between forward transmit data 260, a RIFS 250, and ACK data 280 in accordance with an embodiment of this disclosure. The forward transmit data 260 may be a physical layer transmission, such as a PHY protocol data unit (PPDU). The first device (not shown) may implement a PHY layer configured to prepare the PPDU based on upper layer data. In accordance with the PHY layer, the forward transmit data may be segmented into blocks, referred to as FEC encoded blocks. Typically, each FEC encoded block has a fixed or maximum length. Multiple FEC encoded blocks may be included as part of the payload in a PPDU. Each FEC encoded block may include a sequence number and may be encoded (for example, using a forward error correction coding). The format of FEC encoded blocks is described further in FIG. 7.

Each FEC encoded block may include a check sequence, such as a cyclic redundancy check (CRC) that a receiving device can use to verify successful decoding of the FEC encoded block. In the illustration 200, forward transmit data 260 includes FEC#1 261, FEC#2 262, FEC#n−1 268 (representing second to final FEC encoded block), and FEC#n 269 (representing a final FEC encoded block).

FEC encoded blocks may be transmitted using a modulation waveform 270 having one or more modulation symbols, such as modulation symbol 271, modulation symbol 272, modulation symbol 273, and a final modulation symbol 274. In one example, the modulation symbols may comprise orthogonal frequency division multiplexing (OFDM) symbols or other symbols. OFDM is a multicarrier technology in which every OFDM symbol is comprised of many carriers. Each carrier can potentially carry a different number of bits of information depending on the channel quality for the carrier. In another example, each modulation symbol may be a constellation point in a single carrier modulation scheme.

Each symbol may comprise a group of bits from the PPDU. Depending on the PHY layer configuration, each symbol may include a portion of a FEC encoded block, one FEC encoded block, or more than one FEC encoded block. Example relationships between FEC encoded blocks and modulation symbols are further described in FIGS. 8A-8D. In illustration 200, a portion of FEC#n−1 268 may be included in modulation symbol 273 and a further portion of FEC#n−1 268 may be included in final modulation symbol 274. The final modulation symbol 274 may also include FEC#n 269. Therefore, the receiving device may identify two FEC encoded blocks that end in the final modulation symbol 274.

After the final modulation symbol 274, the communications medium is idle during the RIFS 250. After the RIFS 250, the receiving device may respond with ACK data 280. The ACK data 280 may be sent as a single modulation symbol (as depicted in illustration 200) or may span multiple modulation symbols, depending on the communication system configuration. A communication system may also allow for a receiving device to selectively acknowledge which of the FEC encoded blocks has been decoded correctly. The ACK data 280 may be referred to as a selective acknowledgement (SACK) message. The SACK message may comprise of a block acknowledgement (BA) bitmap where each bit represents an acknowledgment or negative acknowledgment of one or more FEC encoded blocks. In the BA bitmap, a "1" may indicate successful reception and a "0" may indicate an error in that FEC encoded block. When the transmitting device receives the SACK message, it may re-transmit those FEC encoded blocks that were not properly received.

One purpose of the RIFS is to allow processing time for the receiving device to process the final modulation symbol 274 and prepare the ACK data 280. During the RIFS, a receiver may perform several processes. For example, a receiver may demodulate the final modulation symbol 274, decode the FEC encoded blocks that end in the final modulation symbol 274 (such as FEC#n−1 268 and FEC#n 269), check the CRC for each FEC encoded block to determine whether to acknowledge or negative acknowledge each FEC encoded block, generate the BA bitmap, and prepare to send the ACK data 280. The processing time for some of the receiver operations may vary with the channel conditions. For example, at one data rate, the receiving device may use more processing time to decode each FEC encoded block than at another data rate. A determinable portion of the RIFS may be allocated for decoding the FEC encoded blocks that end in the final modulation symbol 274 depending on the data rate or other channel conditions.

Figure 3:
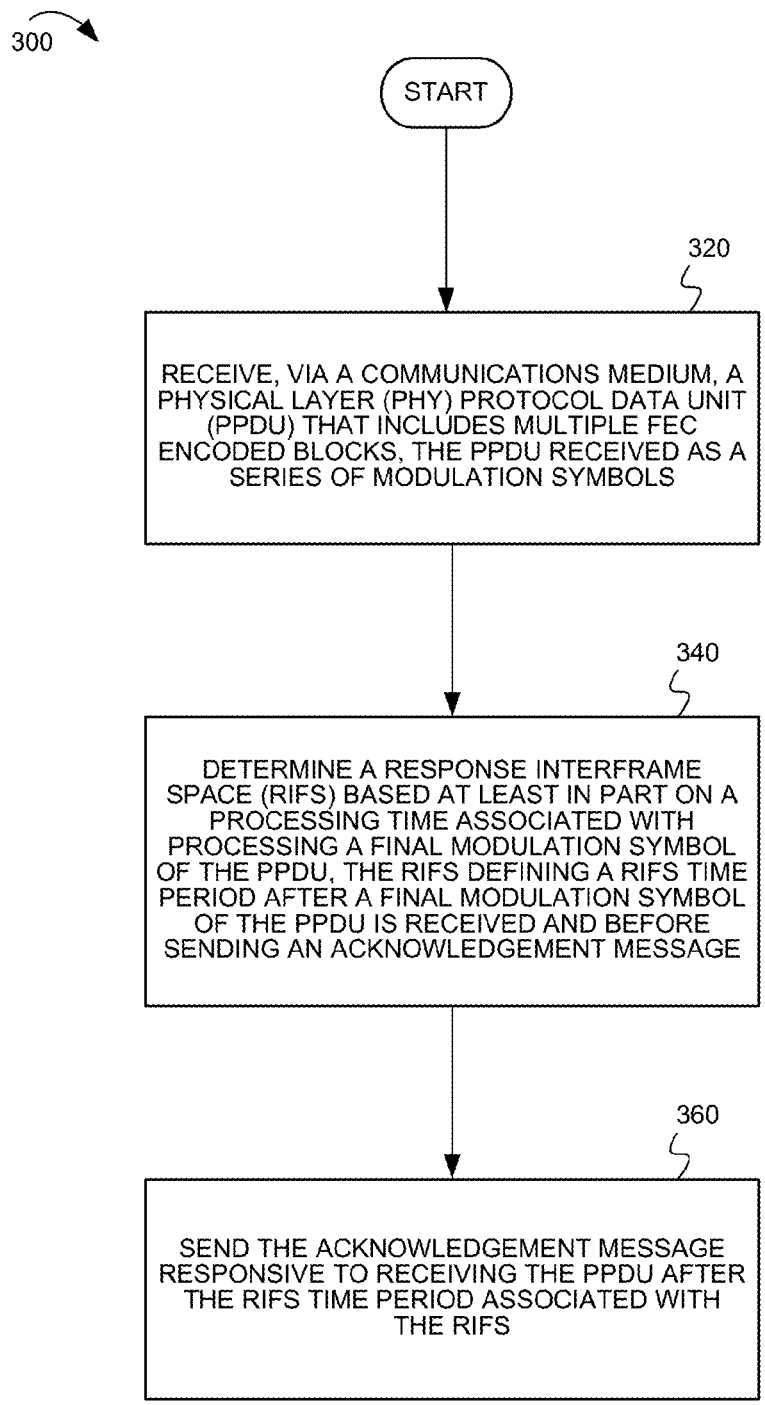
FIG. 3 depicts a flow chart with example operations related to an adaptable response interframe space in accordance with an embodiment of this disclosure.

FIG. 3 depicts a flow 300 with example operations related to determining the RIFS in accordance with an embodiment of this disclosure.

At block 320, a communication device (e.g., a receiver of a communication device) may receive a PPDU via a communications medium. The PPDU may include multiple FEC encoded blocks and may be received as a series of modulation symbols. As described in FIGS. 8A-8D, the quantity of FEC encoded blocks and modulation symbols may not match. However, depending on channel configuration, maximum PPDU size, FEC encoded block length, etc., it may be possible to determine the number of FEC encoded blocks that end in the final modulation symbol.

At block 340, the communication device (e.g., a RIFS determination module of the communication device) may determine the RIFS based at least in part on a processing time associated with processing the final modulation symbol of the PPDU. Processing the final modulation symbol includes decoding the FEC blocks and preparing an acknowledgment message. The RIFS may define a RIFS time period after a final modulation symbol of the PPDU and before sending an acknowledgment message.

At block 360, the communication device (e.g., a transmitter of the communication device) may send the acknowledgment message responsive to receiving the PPDU after the RIFS time period associated with the RIFS.

Figure 4:
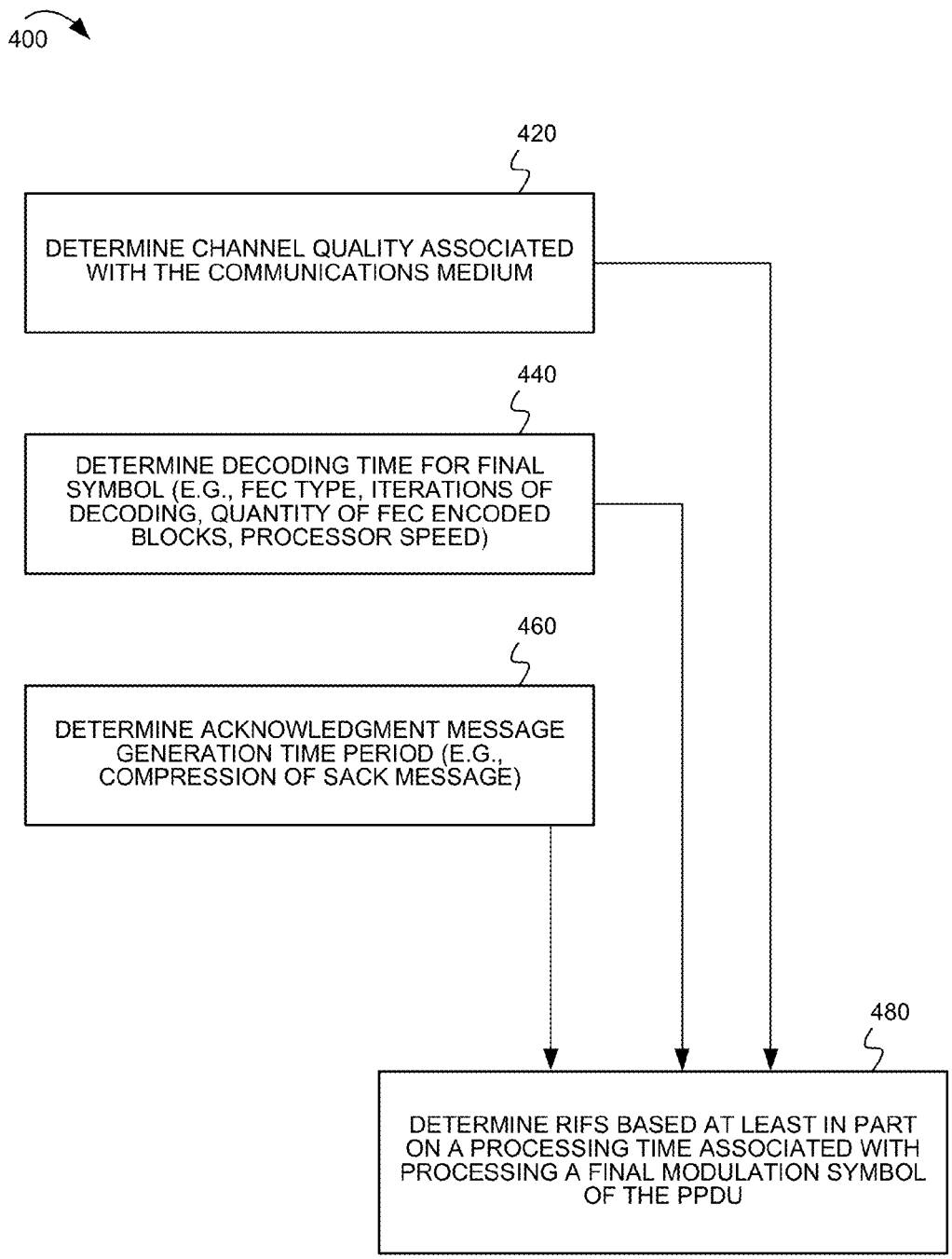
FIG. 4 depicts example operations for determining a response interframe space based on processing time in accordance with an embodiment of this disclosure.

FIG. 4 depicts an illustration 400 showing example operations for determining a response interframe space based on processing time in accordance with an embodiment of this disclosure. The example operations described in blocks 420, 440, 460 may be used separately, combined, or in various combinations. Each of the example operations in blocks 420, 440, 460 may provide information used by the communication device to determine the RIFS.

Example operations at block 420 may include determining channel quality associated with the communications medium. For example, a channel estimation process may be used to measure signal attenuation or noise. The channel estimation process may be used to configure the communications channel. Configurations for the communications channel may include modulation and coding scheme (MCS) for each carrier of the communications channel, a corresponding data rate, and/or timing parameters. A receiver may adjust decoding operations based on the configuration of the communications channel. For example, more decoding iterations may be performed for each FEC encoded block in a poor quality channel, since the decoding iterations may result in an ability to recover the data of the FEC encoded block without causing a retransmission. In a good quality channel, fewer decoding iterations may be needed to successfully decode the FEC encoded block. In one embodiment, a communications device may determine a correlation between processing time and the channel quality such that the RIFS may be selected from the correlation data.

Example operations at block 440 may include determining decoding time for a final modulation symbol of the PPDU. For example, decoding time may be responsive to the type of encoding used to prepare the FEC encoded blocks that end in the final modulation symbol. The decoding time may be responsive to a number of iterations of decoding that are expected for FEC encoded blocks that end in the final modulation symbol. The quantity of FEC encoded blocks that must be decoded after receiving the final modulation symbol may also impact the decoding time for the final modulation symbol. A processor speed of the receiver may also impact the decoding time. For example, one receiver may have a faster processor and may be capable of decoding FEC encoded blocks faster than a different receiver having a slower processor. A receiver may be capable of determining an estimated decoding period associated with the receiver.

Example operations at block 460 may include determining an acknowledgment message generation time. As described previously, a BA bitmap may be included in the acknowledgement. In some implementations, the BA bitmap may be compressed to allow for a smaller acknowledgment message. Compression of the BA bitmap may alter the acknowledgment message generation time, depending on the size of the BA bitmap and the type of compression.

At block 480, the communication device may utilize some or all of the information from blocks 420, 460, 480 to determine the RIFS. Therefore, the RIFS may be based at least in part on a processing time (from blocks 420, 460, 480) associated with processing the final modulation symbol of the PPDU.

FIG. 5 depicts a table 500 illustrating two scenarios in which a response interframe space may be adapted based on channel conditions in accordance with an embodiment of this disclosure.

Column 520 includes features that may be associated with a poor quality channel (e.g., below a quality threshold) relative to a good quality channel (e.g., above the quality threshold) described by column 540. The use of the terms poor and good in this disclosure are intended as relative to each other, for the purposes of describing two different channel conditions. Similarly, the terms lower, higher, less, more, as used in table 500 are relative between the first scenario in column 520 and the second scenario in column 540. A quality threshold may be used to determine whether a communications channel is a good quality channel or a poor quality channel. The quality threshold may be used with a characteristic of the communications channel, such as data rate, signal-to-noise ratio, bit error rate, attenuation, or the like.

In column 520, the poor quality channel may be associated with a lower data rate. For example, the MCS for the carriers in the poor quality channel may use fewer number of bits in each modulation. The overall data rate may be lower due to the conservative modulation rate for one or more carriers. Because fewer bits are included in each symbol and the FEC encoded blocks are a fixed or maximum length, the poor quality channel may be associated with fewer FEC encoded blocks in each modulation symbol. In particular, fewer FEC encoded blocks may end in the final modulation symbol. In the poor quality channel, the receiving device may determine to increase the RIFS if the FEC encoded blocks in the final symbol need more iterations for proper decoding.

In column 540, the good quality channel may be associated with a higher data rate. For example, the MCS for the carriers in the good quality channel may use a greater number of bits in each modulation. The overall data rate may be higher due to the aggressive modulation rate for one or more carriers. Because more bits are included in each symbol, the good quality channel may be associated with more FEC encoded blocks in each modulation symbol. In particular, more FEC encoded blocks may end in the final modulation symbol. In the good quality channel, the receiving device may determine to decrease the RIFS if the FEC encoded blocks in the final symbol if iterations of decoding are needed for proper decoding.

Some communication systems define a maximum number of FEC encoded blocks that may be included in the final modulation symbol. However, this may result in inefficient use of the communications medium, especially on high data rate channels when the transmitter might pad empty data in the final modulation symbol to prevent exceeding the maximum number of FEC encoded blocks set by the communication system. As described further in FIG. 10, the RIFS may be adjusted to accommodate different quantities of FEC encoded blocks in the final modulation symbol responsive to channel conditions.

Figure 6:
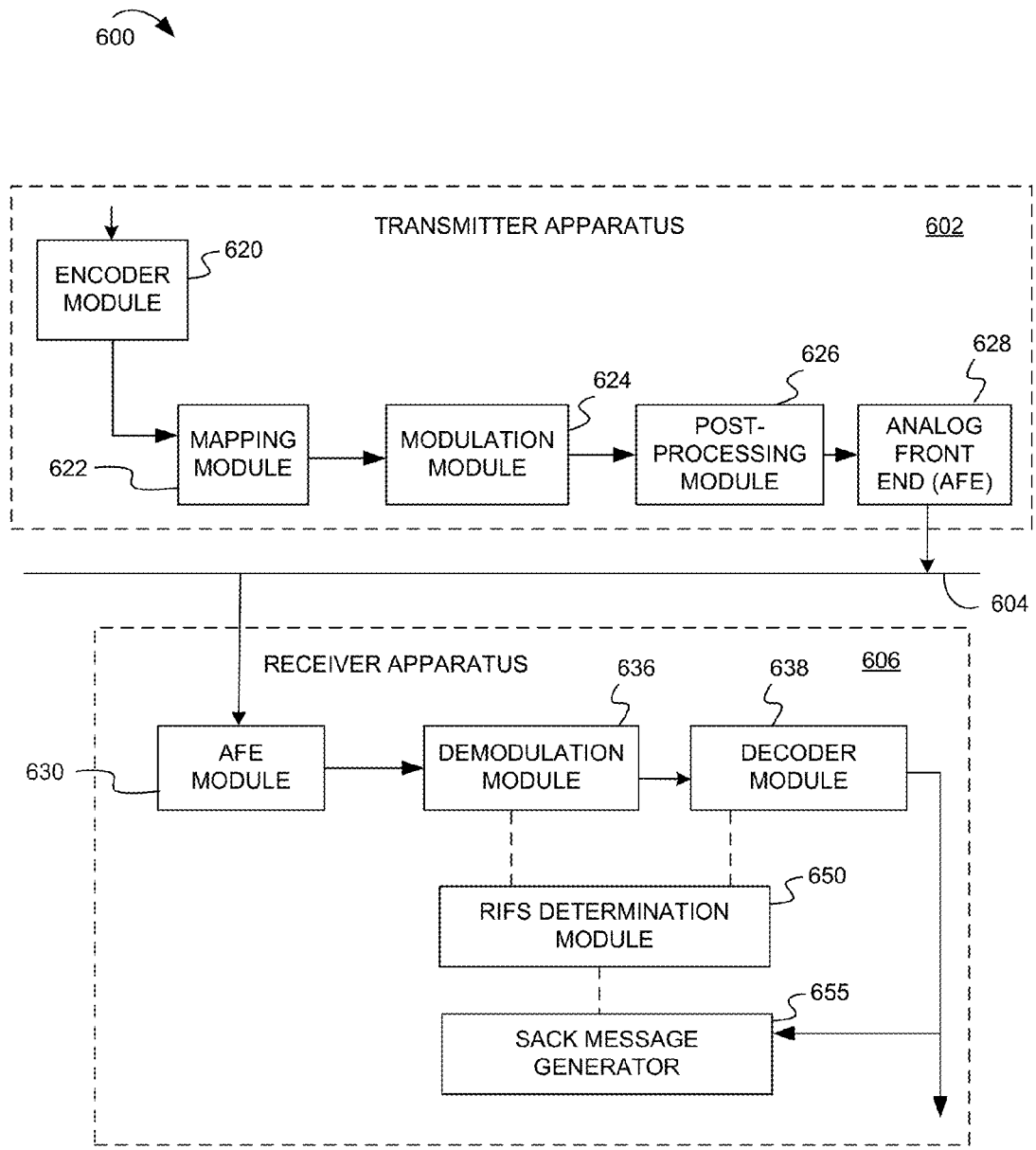
FIG. 6 depicts another example communication system in accordance with an embodiment of this disclosure.

FIG. 6 is a block diagram of a communication system 600 that includes a transmitter apparatus 602 for transmitting a signal (e.g., a sequence of OFDM symbols) over a communications medium 604 to a receiver apparatus 606. The transmitter apparatus 602 and receiver apparatus 606 can both be incorporated into a network interface (such as network interfaces 104, 124) at each device (e.g., first and second devices 110, 120). The communications medium 604 can represent a communications channel from one device to another over a wired or wireless network.

At the transmitter apparatus 602, modules implementing the PHY layer may receive a media access control (MAC) layer protocol data unit (MPDU) from the MAC layer (not shown). The MPDU is sent to an encoder module 620 to be processed, which may include scrambling, error correction coding and interleaving. The encoded MPDU may be referred to as the PPDU. The PPDU may have FEC encoded blocks as described previously, and in further detail in FIG. 7. The PPDU is fed into a mapping module 622 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of a modulation symbol. Alternatively, any appropriate mapping scheme that associates data values to modulated carrier waveforms can be used. The mapping module 622 may also determine the type of modulation to be used on each of the carriers (or "tones") according to a tone map. The tone map can be a default tone map, or a customized tone map provided by the receiver apparatus 606 in response to a channel estimation process.

A modulation module 624 performs the modulation of the resulting set of N complex numbers (some of which may be zero for unused carriers) determined by the mapping module 622 onto N orthogonal carrier waveforms having peak frequencies $f_1, \ldots, f_N$. The modulation module 624 performs an inverse discrete Fourier transform (IDFT) to form a discrete time symbol waveform. In one example, the data from the mapping module 622 is modulated onto subcarrier waveforms using an 8192-point inverse fast Fourier transform (IFFT), resulting in 8192 time samples which make up part of an OFDM symbol. The resulting time samples are in the time domain, while the input to the IDFT is in the frequency domain.

A post-processing module 626 may combine a sequence of consecutive (potentially overlapping) symbols into a "symbol set" that can be transmitted as a continuous block over the communications medium 604. The post-processing module 626 may prepend a preamble to the symbol set that can be used for automatic gain control (AGC) and symbol timing synchronization. An Analog Front End (AFE) module 628 couples an analog signal containing a continuous-time (e.g., low-pass filtered) version of the symbol set to the communications medium 604. Together, the encoder module 620, mapping module 622, modulation module 624, post processing module 626 and AFE module 628 may be referred to as a TX chain of a transmitter. A PHY controller (not shown) may configure and manage various components of the transmitter, including those shown in the transmitter apparatus 602.

At the receiver apparatus 606, modules implementing the PHY layer may receive a signal from the communications medium 604 and generate a received MPDU for the MAC layer (not shown). An AFE module 630 may receive a received signal having the symbol set and send the received signal to a demodulation module 636. The symbol processing module 636 may generate sampled signal data. The demodulation module 636 may also include a discrete Fourier transform (DFT) feature to translate the sampled received waveform into frequency domain data in the form of complex numbers. For example, in an OFDM system, demodulation may involve a fast Fourier transform (FFT). In single carrier systems, demodulation may involve a constellation demapping to convert the symbol to hard or soft bits.

The decoder module 638 may map the complex numbers onto the corresponding bit sequences and performs the appropriate decoding of the bits (including de-interleaving and descrambling). Together, the AFE module 630, demodulation module 636 and decoder module 638 may be referred to as an RX chain of a receiver. The RX chain may include other components (not shown), such as an equalizer, filters, automatic gain control, etc. A PHY controller (not shown) may manage and control the components of the receiver.

Also shown in FIG. 6, the receiver apparatus 606 may include a RIFS determination module 650 and a SACK message generator 655. The SACK message generator 655 may generate a SACK message to indicate the successful (acknowledgment) or unsuccessful (negative acknowledgment) decoding of FEC encoded blocks decoded from the symbol set. In one embodiment, the SACK message generator 655 may also generate and compress a BA bitmap to include in the acknowledgment message.

The RIFS determination module 650 may determine the RIFS based at least in part on a processing time associated with decoding the final modulation symbol of the symbol set. The RIFS determination module 650 may use characteristics of the decoder module 638 (such as processing speed, previous history of decoding iterations used for prior symbols of the symbol set, etc.) to determine the RIFS. The RIFS determination module 650 may also use information about the SACK message generator 655 to determine the RIFS, such as when the SACK message generator 655 is configured to compress the BA bitmap. The RIFS determination module 650 may control the SACK message generator 655 to prevent transmission of the acknowledgment message until the RIFS time period. Upon expiration of the RIFS time period, the RIFS determination module 650 may cause the SACK message generator 655 to send the acknowledgment message via a transmitter (not shown) of the receiver apparatus 606.

In various embodiments, any of the modules of the communication system 600 including modules in the transmitter apparatus 602 and receiver apparatus 606 can be implemented in hardware, firmware, software, or any combination thereof.

Figure 7:
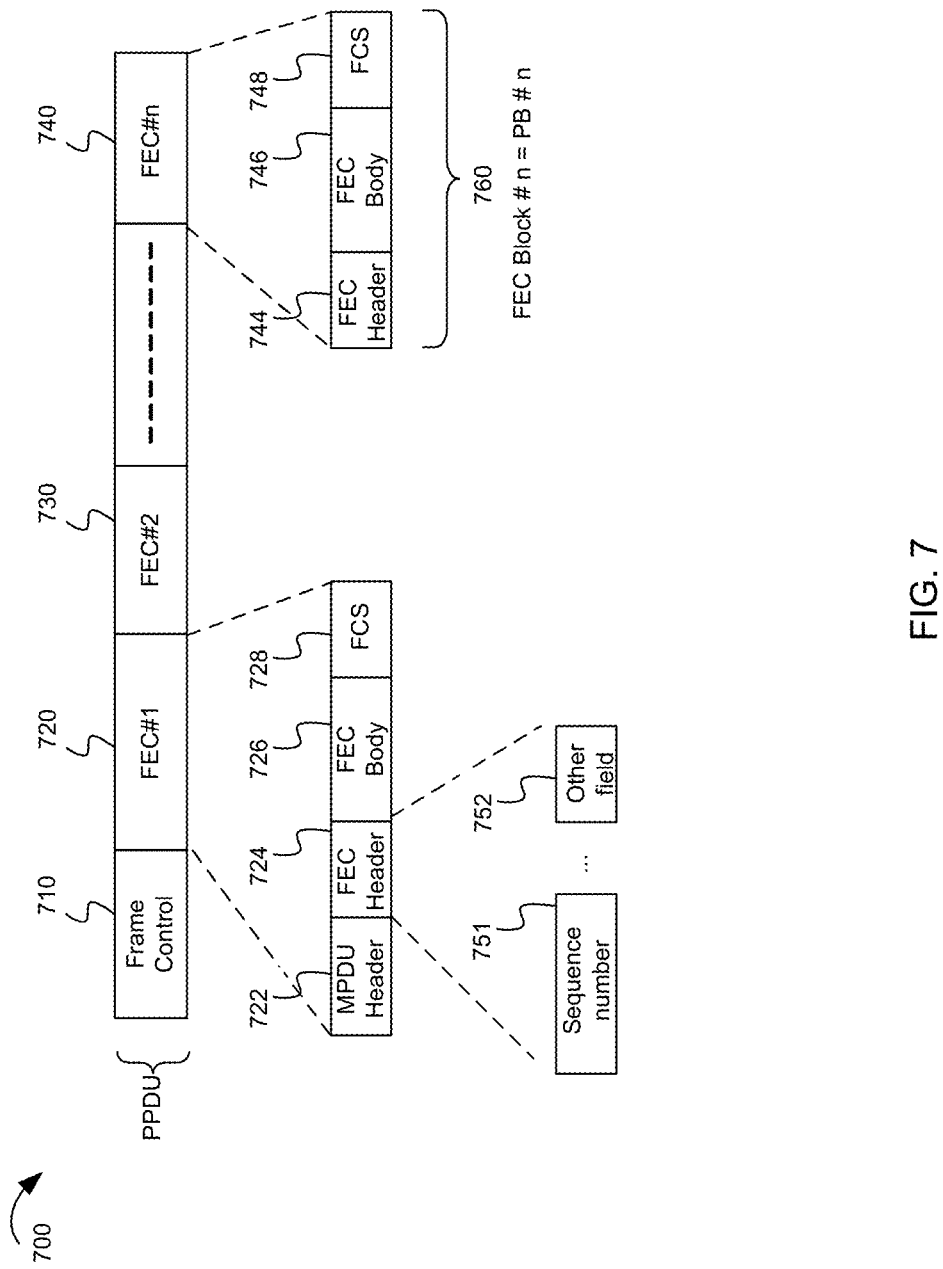
FIG. 7 depicts an example physical protocol data unit in accordance with an embodiment of this disclosure.

FIG. 7 depicts an example PPDU message format 700 in accordance with an embodiment of this disclosure. The example PPDU message format 700 includes a frame control 710, and one or more FEC encoded blocks, such as FEC#1 720, FEC#2 730, FEC#n 740. In some example PPDU message formats, a preamble is also depicted as part of the PPDU. In some implementations, the preamble (not shown in FIG. 7) would be included prior to the frame control 710, and may be modulated prior to or with the frame control 710. The frame control 710 may span one or more symbols depending on the communication system configuration and type of message. The frame control 710 may also be referred to as a start of frame (SOF). The SOF contains information such as the address of the intended receiver, information needed by the receiver for demodulating the data etc. Together, the FEC encoded blocks (including FEC#1 720, FEC#2 730, and FEC#n 740) may be referred to as the data portion of the PPDU.

Each FEC encoded block may have a similar format. The first FEC#1 720 may have an extra field, the MPDU header 722, which may provide information such as encoding information, encryption information, or subframe boundary information, that can be used by the receiver to reconstruct the MPDU. Otherwise, the first FEC#1 720 includes portions that are similar as the other FEC blocks. The first FEC#1 720 includes a FEC header 724, FEC body 726, and FEC block check sequence (FCS) 728. The FEC header 724 may include a sequence number 751 and various other fields 752. The sequence number 751 may uniquely identify the FEC encoded block from the other FEC encoded blocks, such as FEC#2 730 and FEC#n 740. The FCS 728 may be used by the receiver to verify that the FEC#1 720 was properly decoded.

As shown in the example PPDU message format 700, other than the MPDU header 722, the other FEC encoded blocks may include FEC header, FEC body, and FCS. For example the final FEC#n 740 includes FEC header 744, FEC body 746, FCS 748. Together the FEC header 744, FEC body 746, FCS 748 make up a FEC encoded block. In this disclosure, the terms PHY block (PB) and FEC encoded block may be used interchangeably to refer to a PB that has been encoded using a forward error correction (FEC) coding scheme.

FIGS. 8A-8D depict example relationships between a physical layer protocol data unit and physical layer symbols in accordance with an embodiment of this disclosure. The number of bits that can be included in a modulation symbol may or may not match the number of bits associated with an FEC block. In the following figures, several examples are provided in which the number of bits (size) of a modulation symbol does not match the number of bits (size) of an FEC block. Each of FIGS. 8A-8D shows a PPDU having an SOF 810 and data 820. The data 820 may comprise a plurality of FEC blocks, which are modulated as symbols (e.g., OFDM symbols). Following transmission of a final modulation symbol, a RIFS 850 defines a RIFS time period before the selective acknowledgement (e.g., SACK) message 840 is transmitted in response to the PPDU. In the following examples, the size of the FEC blocks is a fixed, uniform size. In some embodiments, the size of the FEC blocks may be variable.

Figure 8A:
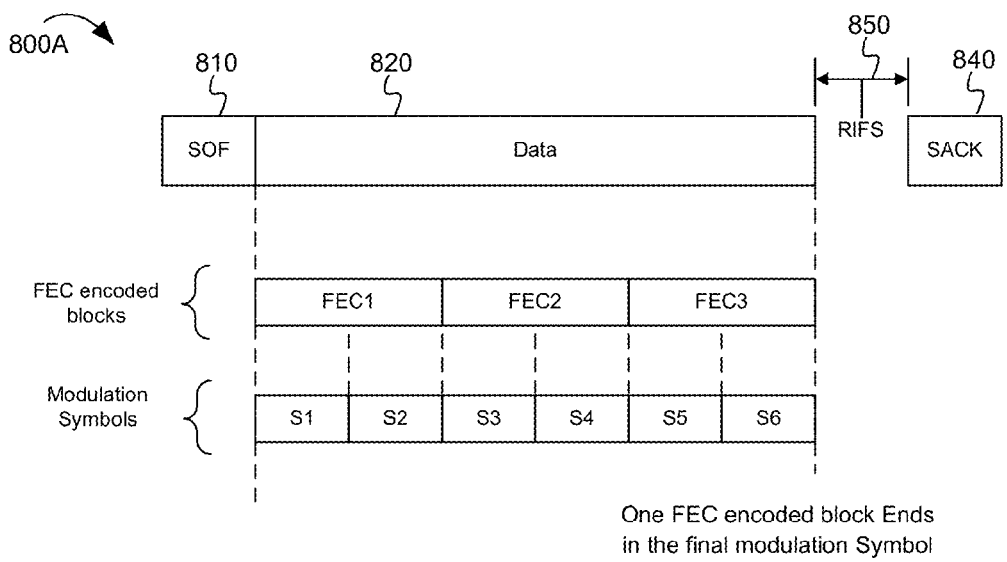
FIGS. 8A-8D depict example relationships between a physical layer protocol data unit and physical layer symbols in accordance with an embodiment of this disclosure.

FIG. 8A shows an example 800A in which each modulation symbol has 0.5 FEC encoded blocks (or 1 FEC encoded block spans two modulation symbols). In FIG. 8A, the PPDU that contains 3 FEC encoded blocks (FEC1 to FEC3) that are modulated using 6 modulation symbols (S1 to S6). As such, each FEC encoded block is spread over two modulation symbols. FEC3 spans two symbols S5, S6. In this example, once the receiver receives symbol S6 it needs to decode one FEC encoded block (FEC3).

Figure 8B:
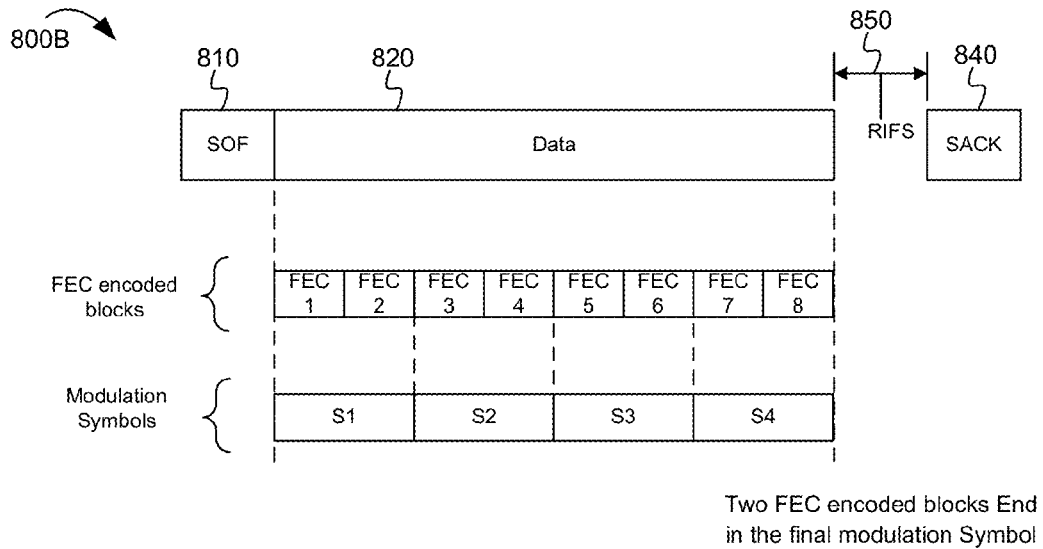

FIG. 8B shows an example 800B in which each modulation symbol has two FEC encoded blocks (or symbol carries half a FEC encoded block). In FIG. 8B, the PPDU that contains 8 FEC encoded blocks (FEC1 to FEC8) that are modulated using 4 modulation symbols (S1 to S4). Symbol S4 contains two FEC encoded blocks, FEC7 and FEC8. In this example, once the receiver receives symbol S4 it needs to decode two FEC encoded blocks (FEC7 and FEC8).

Figure 8C:
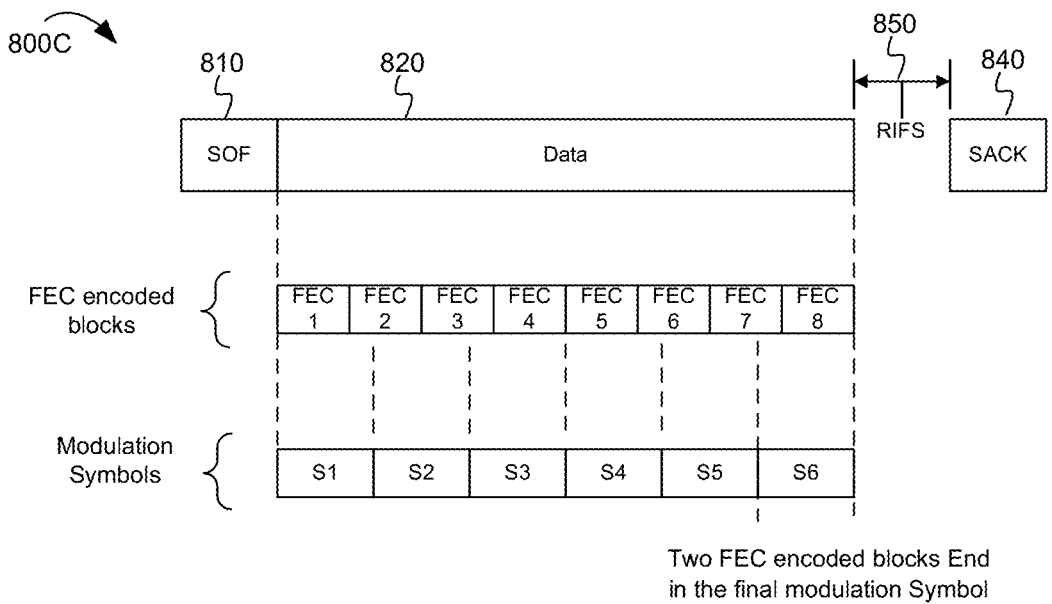

FIG. 8C shows an example 800C in which the size of FEC encoded blocks and the symbol bit rate are not aligned. In FIG. 8C, the PPDU that contains 8 FEC encoded blocks (FEC1 to FEC8) that are modulated using 6 modulation symbols (S1 to S6). Symbol S6 includes a portion of FEC7 and FEC8. In this example, once the receiver receives symbol S6 it needs to decode two FEC encoded blocks (FEC7 and FEC8). Even though part of FEC7 is included in symbol S5, it is noted that the receiver may not decode FEC7 until after receiving symbol S6.

Figure 8D:
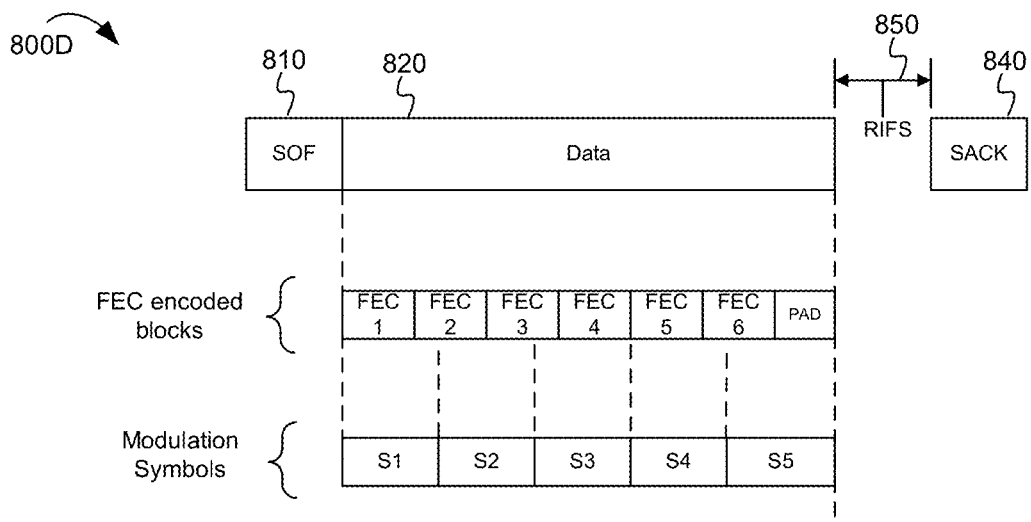

FIG. 8D shows another example 800D in which the size of FEC encoded blocks and the symbol bit rate are not aligned. In FIG. 8D, the PPDU that contains 6 FEC encoded blocks (FEC1 to FEC6) that are modulated using 5 modulation symbols (S1 to S5). Symbol S5 includes a portion of FEC6 and may include padding (denoted as "PAD"). The PAD may represent empty data in the final modulation symbol, such as when there are not enough bits remaining in the final modulation symbol to include another FEC encoded block or when there are no more FED encoded blocks to transmit. Even though part of FEC6 is included in symbol S4, it is noted that the receiver may not decode FEC6 until after receiving symbol S5. In this example, once the receiver receives symbol S5 it needs to decode one FEC encoded block (FEC6).

The FEC encoded block size may be a fixed length or quantity of bits, according to a communication system configuration. Consider a communication system where the FEC encoded block size is 5000 encoded bits and the modulation symbol duration is $T_{sym}$=50 µs. So in the example, shown in FIG. 8A, each 50 µs modulation symbol carries 2500 bits, which results in a physical layer data rate of R=2500 bits/50 µs=50 Mbps. For the example in FIG. 8B, each modulation symbol carries 2*5000 bits giving a physical layer data rate R=2*5000 bits/50 µs=200 Mbps. Thus, it is observed that as the number of FEC encoded blocks in an OFDM system increases, the data rate increases. In other words, a higher data rate may imply a greater number of FEC encoded blocks per modulation symbol when compared to a lower data rate.

Figure 9:
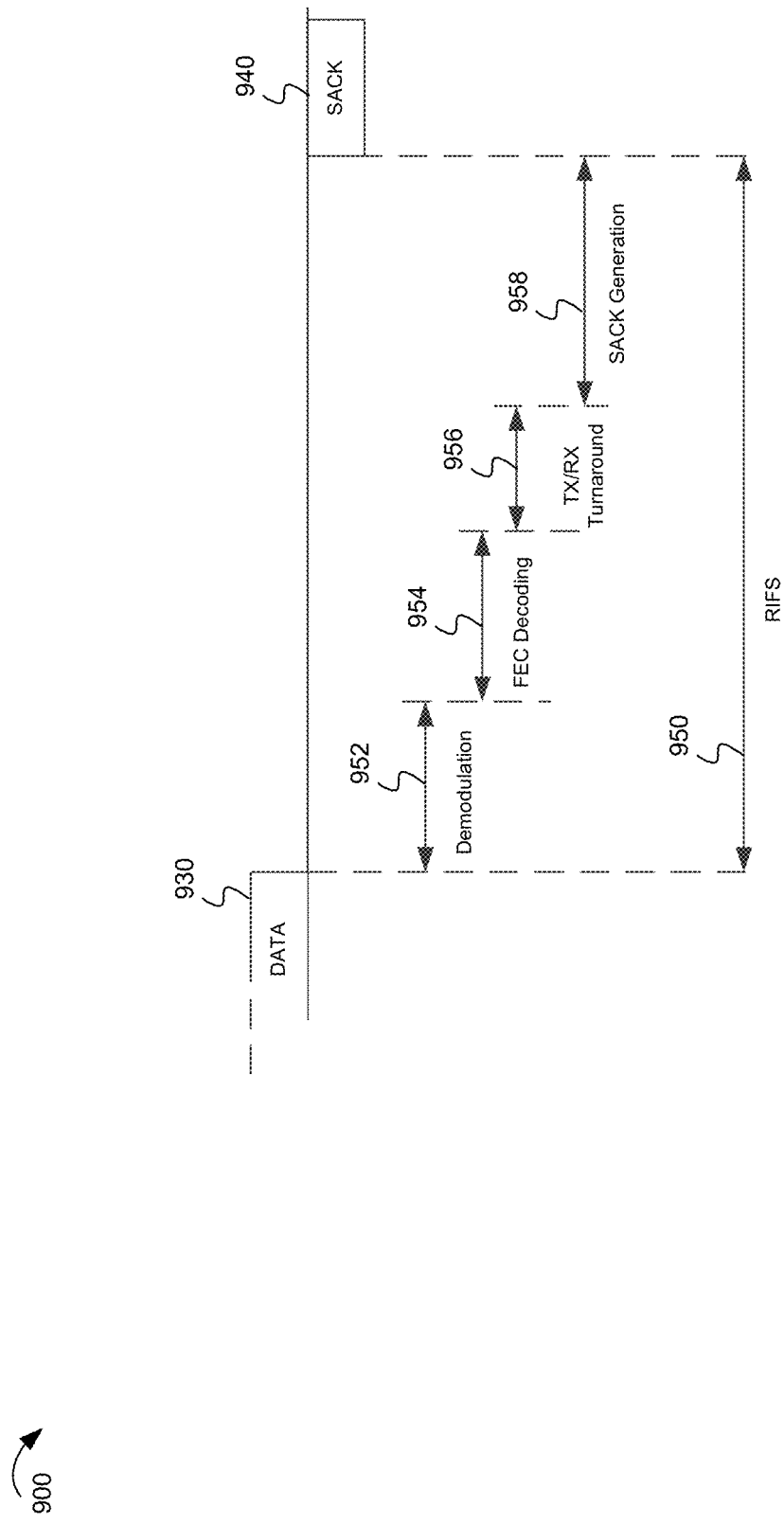
FIG. 9 depicts example operations performed by a receiving device during a response interframe space in accordance with an embodiment of this disclosure.

FIG. 9 depicts an example timing diagram 900 showing operations performed by a receiving device during a response interframe space in accordance with an embodiment of this disclosure. In the example timing diagram 900 of FIG. 9, the RIFS 950 follows receipt of data 930 and before sending a SACK message 940 in response to the data 930.

During the RIFS 950, the receiver may perform several operations. During demodulation time period 952 the receiver may demodulate the final modulation symbol of the data 930. During FEC decoding time period 954, the receiver may decode the FEC encoded blocks that end in the final modulation symbol. During TX/RX turnaround time period 956, the communications device may change a transceiver from a receive mode to a transmit mode to allow transmission of the SACK message 940. During acknowledgment generation time period 958, the receiver may generate the SACK message 940.

While demodulation time period 952 and TX/RX turnaround time period 956 may be fairly constant time periods, the acknowledgment generation time period 958 may change depending on the data rate of the communication system. As described previously, the acknowledgment generation time period 958 may also include compression of a BA bitmap included in the SACK message 940. Different compression techniques might be associated with different acknowledgment generation time periods 958. SACK compression may be used in communication systems where a large number of FEC encoded blocks may be acknowledged in the SACK message. Suppose the SACK message has 50 bits in a BA bitmap to carry acknowledgement info. A communication system may limit a burst of PPDUs to 50 FEC encoded blocks so that each FEC encoded block is acknowledged using a bit in the BA bitmap. However, to increase the number FEC encoded blocks in a burst, a compression scheme could be used so more than 50 FEC encoded blocks can be acknowledged using the 50 bits of a BA bitmap. On good quality channels, more FEC encoded blocks may be included in each modulation symbol, so the receiver may use a compression scheme to acknowledge the large number of FEC encoded blocks in the SACK message. Compression of the SACK info is done during SACK generation and hence takes processing time during the RIFS.

Irrespective of the compression used during the acknowledgment generation time period 958, the demodulation time period 952, TX/RX turnaround time period 956, and acknowledgment generation time period 958 may be relatively stable (e.g., it may not be possible to adjust those times) based at least in part on the processor of the receiver. For instance, the time for demodulation may be determined by an implementation of an integrated circuit that performs the demodulation, and the demodulation time period 952 may not vary. However, the decoding time period 954 may have a potential to change for each transmission. One example in which decoding time period 954 may be variable is when the receivers is configured to perform iterative decoding.

In iterative decoding, decoding is done by repeating a simple decoding procedure multiple times (iterations). The decoding accuracy may improve with each iteration. The decoding may continue until the FEC encoded block is successfully decoded (for instance, the CRC can be checked after each iteration to see if the FEC encoded block has decoded successfully), or until a certain number of iterations have occurred, or until the FEC decoding time period 954 has expired. If the FEC encoded block has not been successfully decoded after the maximum number of iterations or the expiration of the FEC decoding time period 954, a negative acknowledgement for the FEC encoded block may be conveyed to the transmitter in the SACK message.

The decoding time period 954 may be increased or decreased by setting the number of decoding iterations for each FEC encoded block. By determining a number of iterations expected to successfully decode each FEC encoded block that ends in the final modulation symbol, the receiver may be able to determine a decoding time period 954 (and, thus, the RIFS 950) that is sufficient to decode the FEC encoded block without causing unnecessary delay for the SACK message 940.

Figure 10:
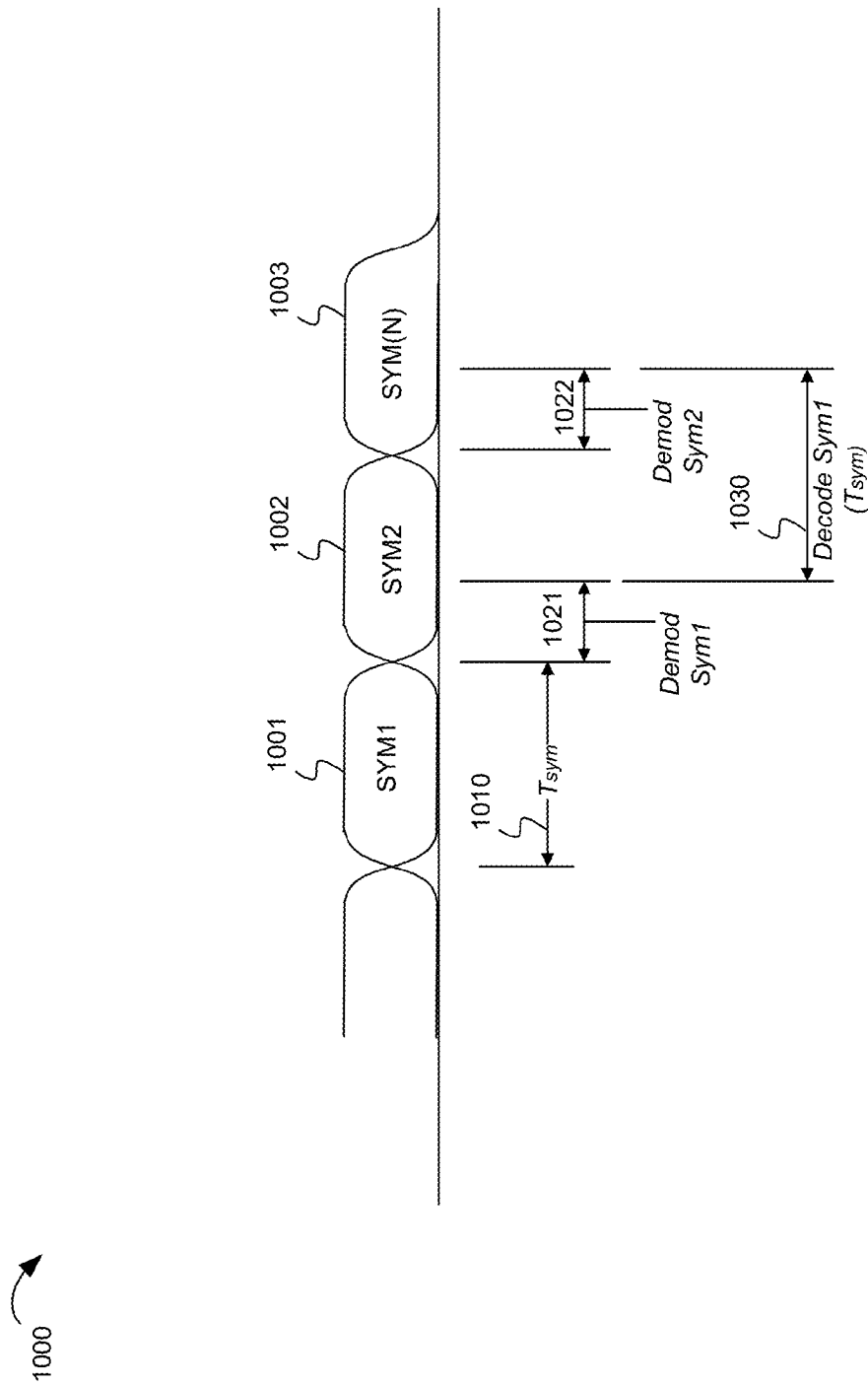
FIG. 10 depicts a timing diagram related to iterative decoding in accordance with an embodiment of this disclosure.

FIG. 10 depicts an example timing diagram 1000 related to iterative decoding in accordance with an embodiment of this disclosure. For simplicity, the example describes a communication system in which a receiver only buffers one modulation symbol at a time.

Let $N_{iter}$ represent the number of decoding iterations, $F_{clk}$ denote the clock frequency (Hz) used in the decoder, and $N_{cycles/iter}$ represent the number of clock cycles required per iteration (in each clock cycle, the decoder process a one or more sections of the FEC block and makes one complete pass through the FEC block in $N_{cycles/iter}$ clock cycles). Then the total decoding time for an FEC block can be calculated as $$T_{dec} = \frac{N_{iter} \times N_{cycles/iter}}{F_{clk}} \qquad (1)$$

The amount of time available for decoding is shown in FIG. 10. Each of symbols 1001, 1002, 1003 may have a symbol duration defined as Tsym 1010. After symbol 1001 is received, symbol 1001 has to be demodulated (shown at 1021) before it can be decoded (shown at 1030). For an OFDM system, demodulation involves taking the FFT of the input symbol and then equalizing it with an estimate of the channel. In an example, demodulation 1021 may take x µs.

Then the decoding has to begin x μs after receiving the symbol 1001. Since data can be buffered for only one modulation symbol, decoding should end before symbol 1002 is demodulated 1022. Symbol 1002 will be demodulated x μs after receiving symbol 1002. Thus, the time available to decode 1030 all the FEC encoded blocks in the symbol 1001 is the modulation symbol duration, $T_{sym}$. Therefore, in a system that can buffer one modulation symbol, a receiving device may have a duration of $T_{sym}$ for decoding all FEC encoded blocks in a symbol. For a system that can buffer $N_{buffer}$ modulation symbols, the receiving device has a duration of $N_{buffer} T_{sym}$ for decoding all FEC encoded blocks in a symbol.

To illustrate an example of a fixed RIFS, consider a receiving device in which $N_{buffer}=1$. Let $N_{b,sym}$ represent the number of FEC encoded blocks in an modulation symbol, and $T_{dec}$ be the decoding time per FEC encoded block as given in eq. (1). Then for a system with $N_{buffer}=1$, $$N_{b,sym} \times T_{dec} = T_{sym} \quad (2)$$

Using eq. (1) in eq. (2), the number of iterations per FEC encoded block can be computed as $$N_{iter} = \left\lfloor \frac{T_{sym} \times F_{clk}}{N_{b,sym} \times N_{cycles/iter}} \right\rfloor, \quad (3)$$

where $\lfloor \ \rfloor$ represents the floor operation (shortest integer less than the argument).

In a system with $T_{sym}$=50 us, and decoder parameters, $F_{clk}$=100 MHz and $N_{cycles/iter}$=400, the number of iterations per FEC encoded block can be calculated. For example, in a system where 0.5 FEC encoded blocks are included in each symbol (such as FIG. 8A), the number of iterations of decoding for each FEC encoded block is 25 iterations. In a system where 1 FEC encoded block is included in each symbol, 12 iterations of decoding may be performed for each FEC encoded block. And in a system where 2 FEC encoded blocks are included in each symbol (such as FIG. 8B), 6 iterations of decoding may be performed for each FEC encoded block. Thus, the more FEC encoded blocks included in a modulation symbol, the fewer iterations may be performed for each FEC encoded block. Data rates may increase as the number of FEC encoded blocks in each modulation symbol increases. Thus, at higher data rates, a greater number of FEC encoded blocks in each modulation symbol may lead to a fewer number of iterations per FEC encoded block. In communication systems using modulation and iterative decoding, the receiving device may perform fewer iterations at higher data rates and more iterations at lower data rates.

Consider a case where the RIFS duration $T_{RIFS}$=100 μs, where the decoding time allocated for decoding during the RIFS is $T_{dec\_RIFS}$=30 μs As in our earlier examples $T_{sym}$=50 μs, and decoder parameters, $F_{clk}$=100 MHz and $N_{cycles/iter}$=400.

Then for the example in FIG. 8A, where 0.5 FEC encoded blocks is included in each symbol, the receiving device needs to decode 1 FEC encoded block during the 30 μs decoding time allocated in the RIFS. The number of iterations for decoding the FEC encoded blocks in the final symbol in FIG. 8A is (eq. (3)) $N_{iter}$=7. However, FEC encoded blocks in symbols other than the final one got 25 iterations as shown above. Relative to the FEC encoded blocks in all the other symbols, the receiving device may perform fewer iterations for FEC encoded blocks in the final modulation symbol. Therefore, for the low data rate associated with FIG. 8A, the receiving device (e.g., RIFS determination module) may determine to increase the RIFS so that the FEC encoded blocks in the final modulation symbol have more than 7 iterations. In some implementations, the RIFS may be increased so that the FEC encoded blocks in the final modulation symbol get 25 iterations to match the 25 iterations that FEC encoded blocks in the other modulation symbols get.

Now consider another data rate, such as in FIG. 8B, in which two FEC encoded blocks are included in each symbol. The receiving device may need to decode 2 FEC encoded blocks in the 30 μs allocated for decoding time during the RIFS. This would allow time for $N_{iter}$=3 to decode each of the 2 FEC encoded blocks in the final FEC encoded block. However, the FEC encoded blocks in other symbols received 6 iterations of decoding. Therefore, unless the RIFS is increased, the FEC encoded blocks in the final modulation symbol may get half the number of iterations that FEC encoded blocks in symbols other than the final symbol received.

Table 1 summarizes the number of iterations for different number of FEC encoded blocks per modulation symbol (data rates) for the parameters used in the earlier examples. Since the FEC encoded blocks in the final symbol get fewer iterations, the performance is worse relative to the other FEC encoded blocks (performance increases with iterations). Thus FEC encoded blocks that end in the final symbol are more likely to be in error and become a bottleneck to performance.

TABLE 1

Number of decoding iterations for FEC blocks in the final symbol and other symbols for various data rates in communication system that does not limit the number of FEC encoded blocks in the final symbol

| Number of FEC encoded blocks per modulation symbol | Data Rate (Mbps) | Number of Iterations per FEC encoded block in symbols other than the final symbol | Number of iterations for FEC encoded blocks in the final symbol |
| --- | --- | --- | --- |
| 0.5 | 50 | 25 | 15 |
| 1 | 100 | 12 | 7 |
| 1.5 | 150 | 8 | 5 |
| 2 | 200 | 6 | 3 |
| 2.5 | 250 | 5 | 3 |
| 3 | 300 | 4 | 2 |
| 3.5 | 350 | 3 | 2 |
| 4 | 400 | 3 | 1 |
| 4.5 | 450 | 2 | 1 |
| 5 | 500 | 2 | 1 |

On high data rate channels, some implementations restrict the number of FEC encoded blocks in the final modulation symbol to one or two. Consider the restriction of having a single FEC encoded block in the final modulation symbol. In this case, the final FEC encoded block will always get 7 iterations regardless of the data rate. On high data rate channels (such as 200 Mb or greater), the transmitted PPDU may have 2 or more FEC encoded blocks per modulation symbol. The FEC encoded blocks in symbols other than the final symbol get 6 or less iterations. Therefore the FEC encoded blocks in the final symbol would get more iterations (7 iterations) than other FEC encoded blocks in the other symbols.

For example, on a 500 Mbps channel (5 FEC encoded blocks/symbol), the FEC encoded blocks in modulation symbols other than the final modulation symbol would get 2 iterations each, while the final FEC encoded block would get 7. Such high data rates are possible on good channels that have high signal-to-noise ratios (SNRs). Under such low noise cases, having extra iterations may not help as much.

Therefore, having fixed RIFS may add to the transmission overhead by requiring a larger than required RIFS. If the number of FEC encoded blocks in the final modulation symbol is limited in accordance with the communication system configuration, then the receiver device may reduce the RIFS to minimize the overhead. The RIFS may be determined based on the amount of decoding time needed for a same number of iterations that other FEC encoded blocks in the other modulation symbols get.

Alternatively, in a communication system in which FEC encoded blocks in other symbols would otherwise get a greater number of iterations than the FEC encoded blocks in the final modulation symbol, the receiver may determine a longer RIFS to allow for more iterations of decoding for the FEC encoded blocks in the final modulation symbol.

Figure 11:
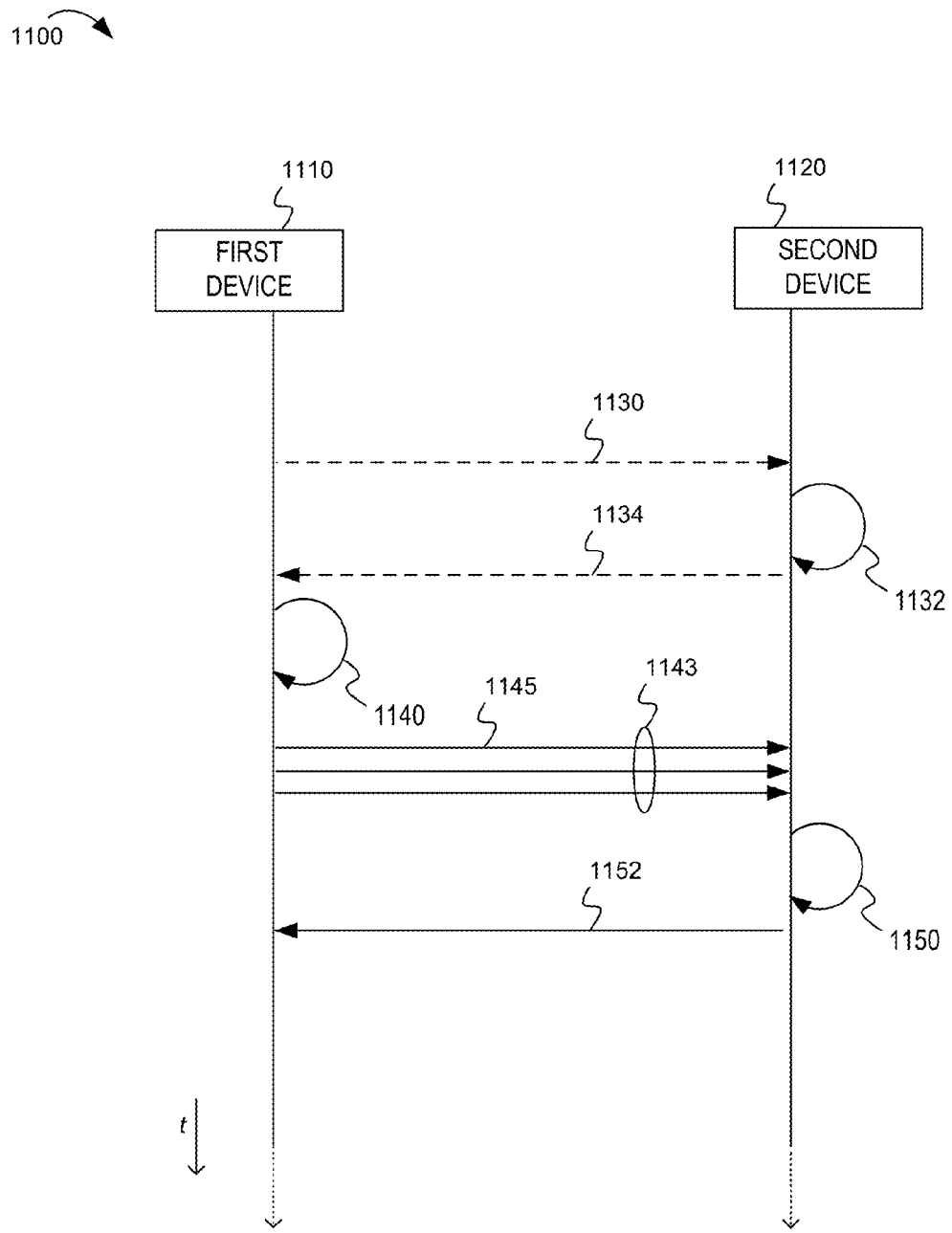
FIG. 11 depicts an example message flow in which a response interframe space may be used in accordance with an embodiment of this disclosure.

FIG. 11 depicts an example message flow 1100 in which a response interframe space may be used in accordance with an embodiment of this disclosure. A first device 1110 (e.g., transmitting device) and a second device 1120 (e.g., receiving device) may be coupled by a communications medium (not shown). FIG. 11 illustrates one mechanism by which the first device 1110 and second device 1120 may communicate about a RIFS determined by the second device 1120 based on channel conditions and/or processing time for decoding a final modulation symbol of a PPDU.

At 1130, a prior transmission from the first device 1110 to the second device 1120 may be used to determine channel quality. For example, the prior transmission may be sounding messages transmitted as part of a channel estimation process. Alternatively, the prior transmission may be a previous PPDU. At 1132, the second device 1120 may determine the channel quality based on the prior transmission. For example, sounding symbols or data symbols with known MCS values may be transmitted by the first device 1110. Based at least in part on the sounding symbols from the first device 1110, the second device 1120 may compute various metrics about the channel quality, such as signal to noise ratio, signal attenuation, block error rate, bit error rate, etc. The second device 1120 may determine what MCS should be used by the first device 1110 for subsequent transmissions. In a multicarrier system, each carrier may have a different modulation value so the MCS comprises of a vector of modulation values (one per carrier) and a common code rate applicable to all carriers.

Furthermore at 1132, the second device 1120 may determine a RIFS that is appropriate for the channel conditions. In one example, the second device 1120 may determine physical layer configuration properties (such as MCS, symbol bit rate, etc.) that will be sent to the first device 1110 in a tone map message. The second device 1120 may determine the data rate of the communications channel based on the channel conditions and/or physical layer configuration properties. The RIFS may be determined relative to the data rate.

At 1134, the second device 120 may communicate the RIFS to the first device 1110 as part of a management message. An example management message is described in FIG. 14. The management message may be sent as part of a channel estimation process, such as in a channel estimation results message. The management message may also be sent together with a tone map or other physical layer configuration properties.

At 1140, the first device 1110 may prepare a PPDU for transmission to the second device 1120. At 1143, a symbol set may be transmitted to the second device 1120. Each symbol 1145 may include a portion of a FEC encoded block, a complete FEC encoded block, or more than one FEC encoded block. At 1150, the second device 1120 may process the received symbol set, including a final modulation symbol. The second device 1120 may utilize the RIFS to decode the FEC encoded blocks in the final modulation symbol and prepare an acknowledgment message. At 1152, after the RIFS time period, the second device 1120 may transmit the acknowledgment message to the first device 1110. The first device 1110 may sense the communications medium for the acknowledgment message starting at the time following the RIFS time period.

Figure 12:
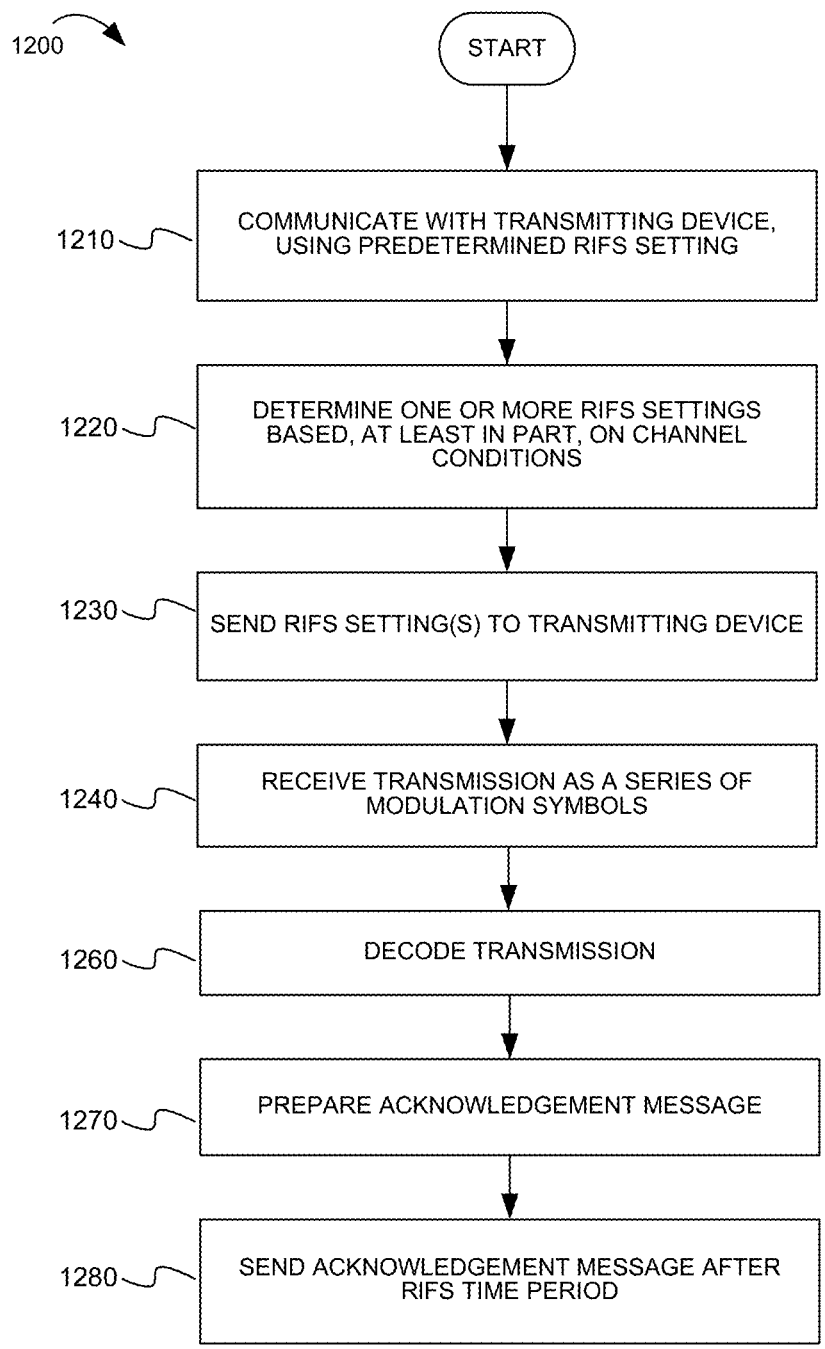
FIG. 12 depicts another flow chart with example operations for determining and communicating an adaptable response interframe space in accordance with an embodiment of this disclosure.

FIG. 12 depicts another flow chart 1200 with example operations related to an adaptable response interframe space in accordance with an embodiment of this disclosure.

At block 1210, an apparatus (such as second device 120, receiver apparatus 606 or second device 1120) may communicate with a transmitting device using a predetermined RIFS setting. For example, the predetermined RIFS setting may be a default, pre-programmed, configured, or negotiated RIFS setting. The RIFS setting may comprise a value that is known to both the transmitting device and the apparatus.

At block 1220, an apparatus may determine one or more RIFS settings based, at least in part, on channel conditions (such as the data rate of the communications channel). In one embodiment, the apparatus may use a first RIFS (e.g., having a shorter RIFS time period) for a higher data rate channel. The apparatus may use a second RIFS (e.g., having a longer time period) for a lower data rate channel.

At block 1230, the apparatus may send RIFS setting(s) to the transmitting device. In one example, the RIFS setting(s) may be included in a Management Message (MME). The MME may include more than one RIFS setting, such as when different data rates may be used on the communications channel. In one example, an MME may include multiple tone maps, each having a different corresponding data rate and RIFS setting.

At block 1240, the apparatus may receive transmission as a series of modulation symbols. At block 1260, the apparatus may decode the transmission, including the FEC encoded blocks that end in a final modulation symbol of the transmission. At block 1270, the apparatus may prepare an acknowledgment message. At block 1280, the apparatus may send the acknowledgment message after the RIFS time period (from block 1230).

Figure 13:
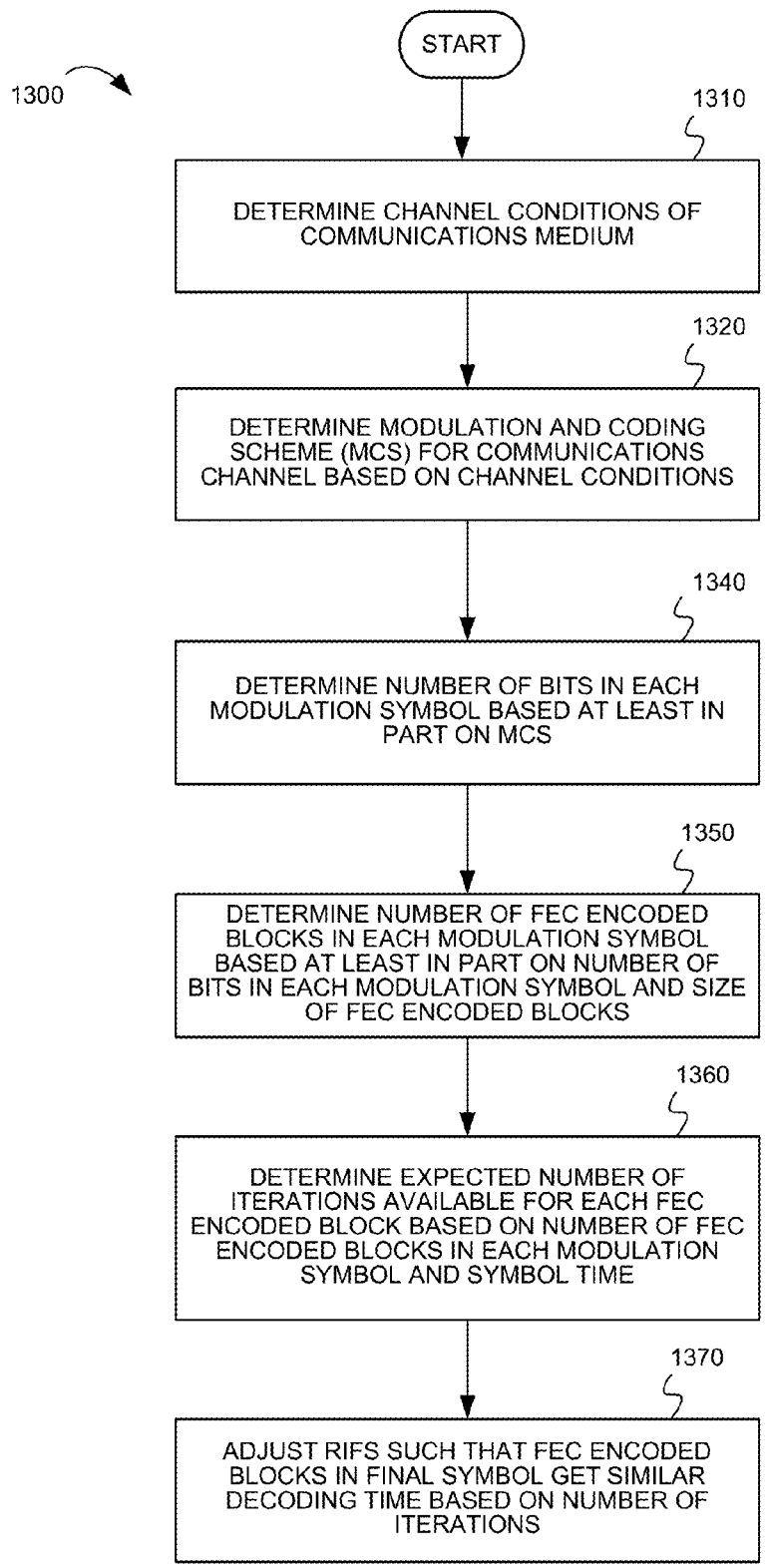
FIG. 13 depicts another flow chart with example operations for determining a response interframe space based, at least in part, on channel conditions in accordance with an embodiment of this disclosure.

FIG. 13 depicts another flow chart 1300 with example operations for determining a response interframe space based, at least in part, on channel conditions in accordance with an embodiment of this disclosure.

At block 1310, an apparatus (such as second device 120, receiver apparatus 606 or second device 1120) may determine channel conditions of communications medium based on a channel estimation process between a first device and the apparatus. At block 1320, the apparatus may determine a modulation and coding scheme (MCS) for one or more carriers of the communications channel based on the channel conditions. At block 1340, the apparatus may determine a number of bits in each modulation symbol based at least in part on the MCS for the carriers used in each modulation symbol. The number of bits in each modulation symbol may be referred to as the symbol bit rate.

At block 1350, the apparatus may determine a number of FEC encoded blocks in each modulation symbol based at least in part on the symbol bit rate and the size (quantity of bits) of FEC encoded blocks. The size of the FEC encoded blocks may be specified by the communication system configuration and may be a fixed size depending on the network technology used in the communication system.

At block 1360, the apparatus may determine an expected number of decoding iterations available for each FEC encoded block based on number of FEC encoded blocks in each modulation symbol and symbol transmission time. The symbol transmission time may be specified by the communication system configuration and may be standardized depending on the network technology used in the communication system.

At block 1370, the apparatus may adjust the RIFS such that FEC encoded blocks in a final modulation symbol will get a same or similar number of decoding iterations as other FEC encoded blocks in symbols other than the final modulation symbol. The decoding time may be determined based on the receiver processor capability, the number of decoding iterations, and the quantity of FEC encoded blocks in the final modulation symbol. The RIFS may include the decoding time plus additional time for receiver operations between the final modulation symbol and the acknowledgment message. In one embodiment, a value indicating the RIFS may be communicated to the transmitting device, such as in a management message or control message.

In some embodiments, the calculation of RIFS time periods may be done in advance of receiving a symbol set. For example, the apparatus may maintain a vector, database, lookup-table, or other data structure that correlates the RIFS to a metric or range of metric values. The receiver may compute the metric and then select the RIFS based on the correlation data. For example, if the metric is between M1 and M2, then a RIFS value of RIFS 1 is used. Example of metrics may include: the number of FEC encoded blocks/modulation symbol, the data rate, and the number of symbol bit rate, etc. The table below illustrates examples of RIFS values correlated to ranges of metric values.

| Metric Range | | RIFS Value |
|---|---|---|
| $M_1$ | $M_2$ | RIFS 1 |
| $M_3$ | $M_4$ | RIFS 2 |
| ... | ... | ... |
| $M_{k-1}$ | $M_k$ | RIFS N |

In the previous example, a receiving device may determine the RIFS time period. However, there may be examples in which a transmitting device may determine the RIFS time period. For example, in some communication systems, a transmitting device drives the rate adaptation process. The transmitting device may determine the modulation and coding scheme (MCS) and modify the MCS based on the ACK/SACK information sent by the receiving device. For example, if all the data gets through successfully, the transmitting device may change the MCS to increase data rates. If the receiving device reports errors in reception, the transmitting device may change the MCS to reduce the data rate. Alternatively, the transmitting device may also determine an MCS by monitoring the reverse channel (for instance by looking at SNRs on packets coming from the receiving device). Once the transmitting device chooses the MCS, the transmitting device may adapt the RIFS to optimize performance using techniques similar to that described in the previous example. For instance, the transmitting device could compute the data rate or number of FEC encoded blocks per symbol or number of bits per symbol and use that to decide on a RIFS. The RIFS may be communicated to the receiving device using an MME, control message, or a handshaking procedure.

In some implementations in which the transmitting device determines the RIFS, the transmitting device and receiving device may utilize a formal protocol for exchanging capability information. For example, a receiving device may send a control message to inform the transmitting device that it supports adaptation of the RIFS and the smallest RIFS can be supported by the receiving device. If capability information is not exchanged, then alternatively, a receiving device may communicate a control message rejecting an offered RIFS if the transmitting device offers a RIFS smaller than the receiving device can support due to processor or other limitations.

Figure 14:
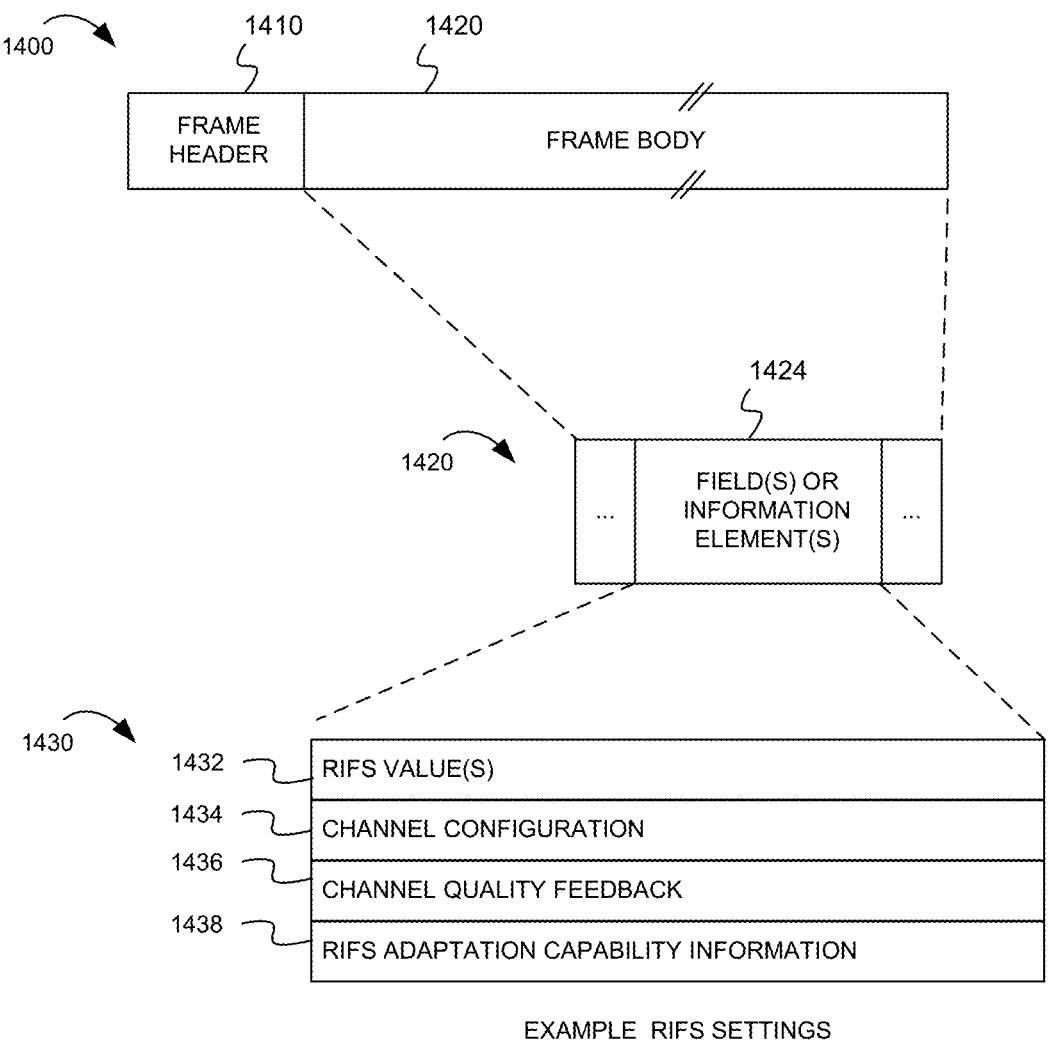
FIG. 14 depicts an example management message for communicating a determined response interframe space time period in accordance with an embodiment of this disclosure.

FIG. 14 depicts an example management message (MME) 1400 for communicating between a transmitting device and a receiving device. The MME 1400 may include a frame header 1410 and a frame body 1420. Other portions of the MME are not shown but may be included in other example MME message formats.

The frame body 1420 may comprise one or more fields or information elements, such as field or information element 1424. FIG. 14 include several example RIFS settings 1430 that may be included in a fields or information element 1424 of the MME 1440. Examples of RIFS settings include:

One or more RIFS values 1432. The RIFS value may indicate the determined RIFS time period. In implementations where different data rates or physical layer properties may be used, the RIFS values may include more than one RIFS value, such as a vector of RIFS values that are associated with corresponding tone maps.

Channel configuration 1434. The MME 1400 may include settings for the communications channel, such as a maximum number of FEC encoded blocks in the final modulation symbol, a tone map, or other settings.

Channel quality feedback 1436. In an example where the RIFS is based on channel quality measured from sounding symbols, a receiving device may also provide metrics associated with the channel quality.

RIFS adaptation capability information 1438. A transmitting device or receiving device may indicate support for custom RIFS, and/or may indicate a smallest RIFS that the device is capable of supporting.

Figure 15:
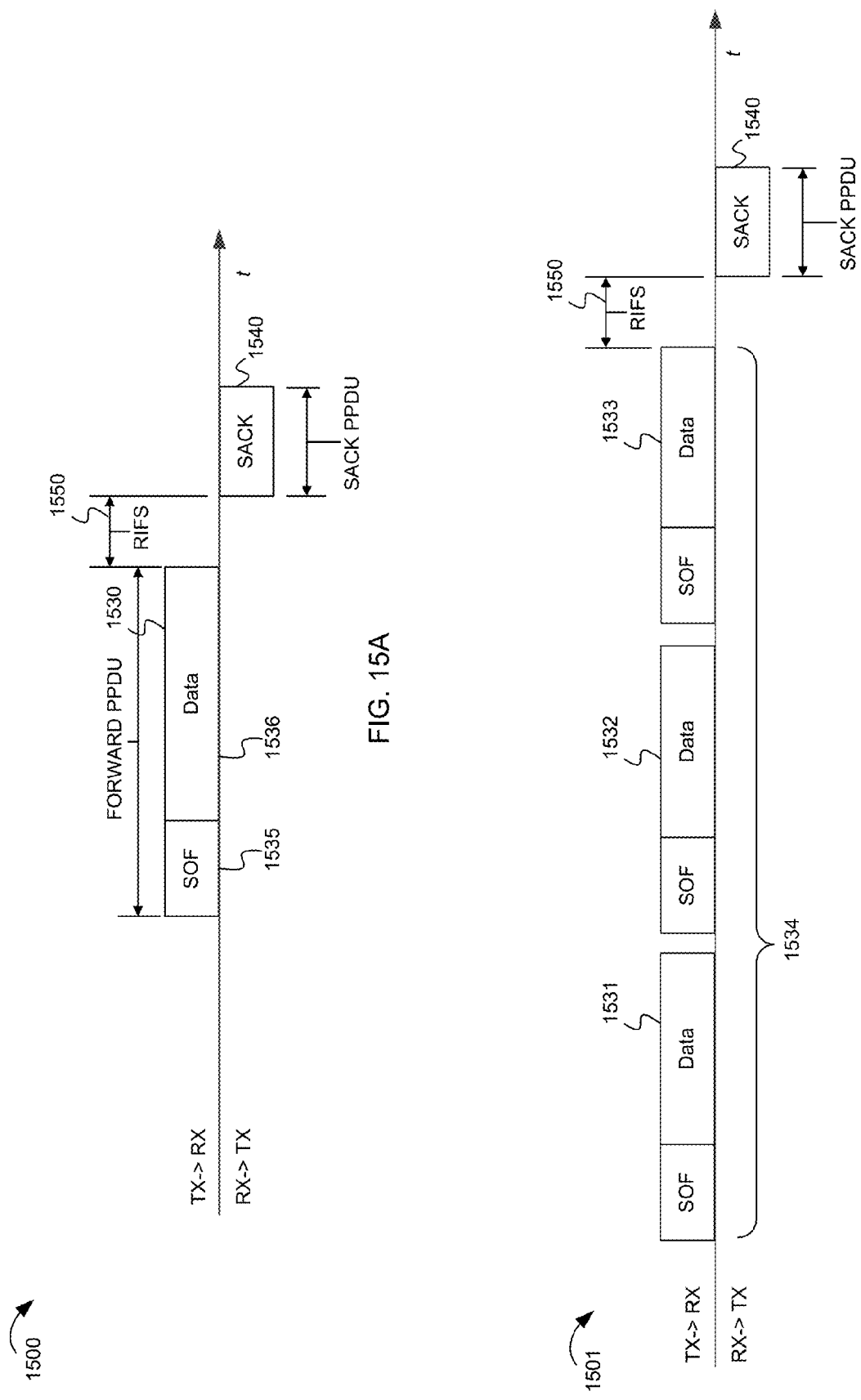
FIGS. 15A-15B depict example transmissions in which an adaptable response interframe space may be used in accordance with an embodiment of this disclosure.

FIGS. 15A-15B depict example transmissions showing RIFS in context of a single PPDU in FIG. 15A and a burst of PPDUs in FIG. 15B. In the example 1500 of FIG. 15A, a PPDU 1530 comprises a SOF 1535 and a data portion 1536. The data portion may be made of a series of FEC encoded blocks and may be transmitted as a series of modulation symbols. The RIFS 1550 follows a final modulation symbol of the PPDU 1530. The SACK message 1540 is transmitted (from the receiving device to transmitting device) after the RIFS 1550.

In a communication system that supports a burst of PPDUs, the transmitting device may send several PPDUs consecutively. Such as the example 1501 of FIG. 15B, the transmitter may transmit a first PPDU 1531, followed by a second PPDU 1532, and a third PPDU 1533. The RIFS 1550 follows the final modulation symbol of the third PPDU 1533 (e.g., the final PPDU in the burst).

Various example embodiments have been described wherein a receiving device or a transmitting device may determine an RIFS based on a processing time associated with a final modulation symbol of a PPDU. The determined RIFS may be referred to as a custom RIFS, adapted RIFS, or channel-specific RIFS. The custom RIFS may be associated with a particular receiver or may be associated with a group of receivers. For example, receivers that belong to a group (e.g., by manufacturer, model number, group identifier, network identifier, etc.) may utilize the custom RIFS, while other receivers not belonging to the group may utilize a standardized or fixed value RIFS associated with the communication system. In some embodiments, the custom RIFS may be associated with a particular PPDU or group of PPDUs. For example, depending on the type of encoding used for the FEC encoded blocks, the decoding time may change for a receiver. A receiver may indicate a custom RIFS associated with different encoding schemes that a transmitter may use to transmit various PPDUs.

FIGS. 1-15B and the operations described herein are examples meant to aid in understanding various embodiments and should not be used to limit the scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
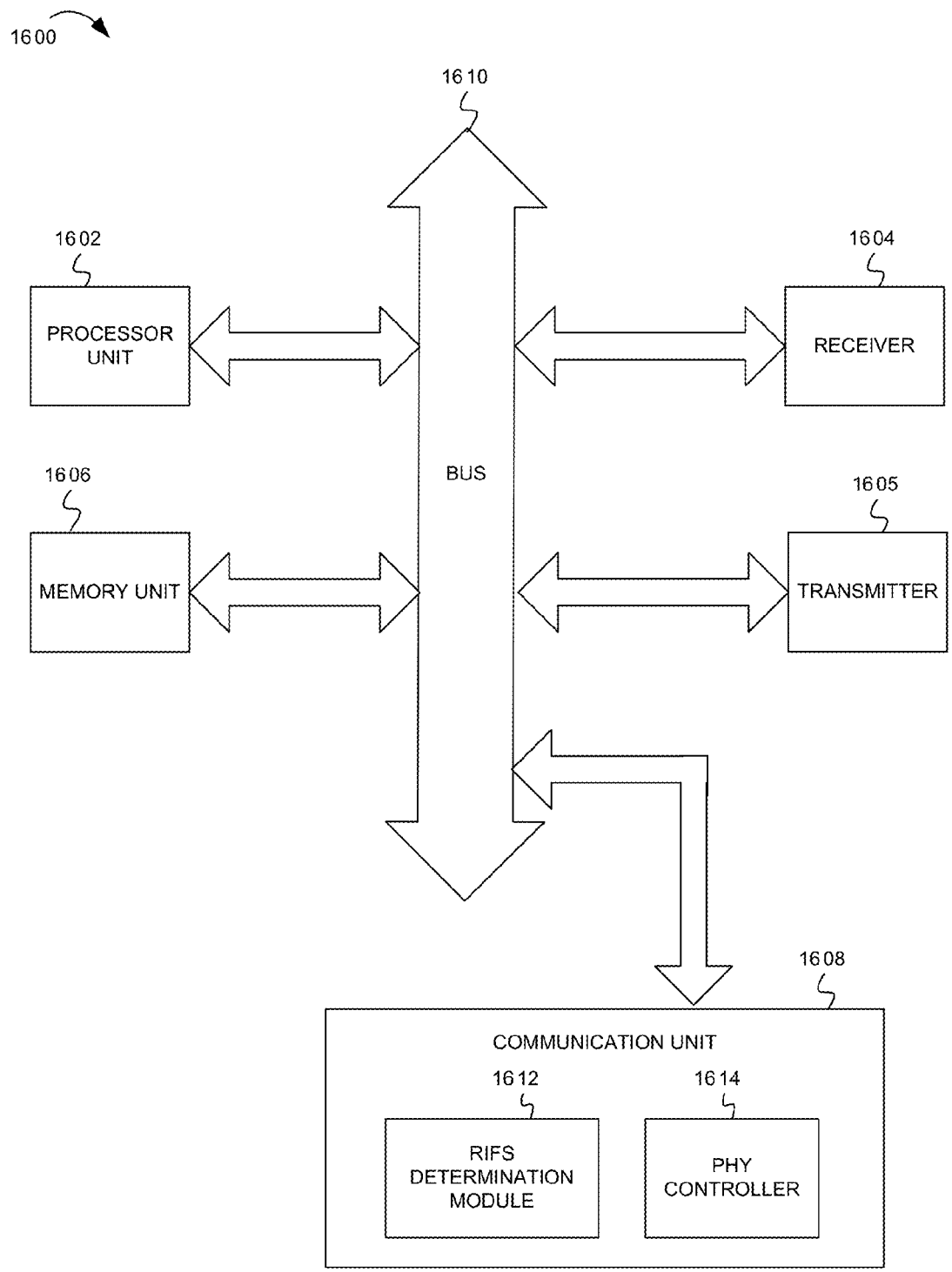
FIG. 16 depicts an example electronic device capable of implementing various embodiments of this disclosure.

FIG. 16 is an example block diagram of one embodiment of an electronic device 1600 capable of determining a RIFS in accordance with various embodiments of this disclosure. In some implementations, the electronic device 1600 may be an electronic device such as a laptop computer, a tablet computer, a mobile phone, a powerline communication device, a gaming console, or other electronic systems. In some implementations, the electronic device may comprise functionality to communicate across multiple communication networks (which form a hybrid communication network). The electronic device 1600 includes a processor unit 1602 (possibly including multiple processors, multiple cores, multiple nodes, and/or implementing multi-threading, etc.). The electronic device 1600 includes a memory unit 1606. The memory unit 1606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1600 also includes a bus 1610 (e.g., PCI, ISA, PCI-Express, HyperTransport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.).

The electronic device 1600 may include a transmitter 1605 and a receiver 1604. Together the transmitter 1605 and receiver 1604 may comprise a network interface (such as network interface 104, 124). The electronic device 1600 may include a PHY controller 1614 to manage physical layer components of the network interface. The electronic device 1600 may also include an RIFS determination module 1612 (similar to RIFS determination module 126, 650). In some implementations, the PHY controller 1614 and RIFS determination module 1612 may comprise part of a communication unit 1608.

Any one of these functionalities may be partially (or entirely) implemented in hardware and/or on the processor unit 1602. For example, the functionality may be implemented with an application specific integrated circuit, in logic implemented in the processor unit 1602, in a co-processor on a peripheral device or card, etc. Further, realizations may include fewer or additional components not illustrated in FIG. 16 (e.g., video cards, audio cards, additional network interfaces, peripheral devices, etc.). The processor unit 1602, the memory unit 1606, transmitter 1605, receiver 1604, and communication unit 1608 may be coupled to the bus 1610. Although illustrated as being coupled to the bus 1610, the memory unit 1606 may be directly coupled to the processor unit 1602.

While the embodiments are described with reference to various implementations and exploitations, it will be understood that these embodiments are illustrative and that the scope of the present subject matter is not limited to them. In general, techniques for determining a RIFS as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A method for communicating via a communications medium, the method comprising:
   receiving, via the communications medium, a physical layer (PHY) protocol data unit (PPDU) that includes multiple forward error correction (FEC) encoded blocks, the PPDU received as a series of modulation symbols;
   selecting a response interframe space (RIFS) based, at least in part on a processing time associated with processing a final modulation symbol of the PPDU, the RIFS defining a RIFS time period after the final modulation symbol of the PPDU is received and before sending an acknowledgment message in response to receiving the PPDU; and
   sending the acknowledgment message after the RIFS time period associated with the RIFS.

2. The method of claim 1, wherein the processing time associated with processing the final modulation symbol is based, at least in part, on channel quality associated with the communications medium.

3. The method of claim 2, further comprising, prior to receiving the PPDU:
   determining the channel quality of the communications medium based, at least in part, on a prior transmission earlier than the PPDU;
   estimating the processing time associated with processing the final modulation symbol of the PPDU based, at least in part, on the channel quality of the communications medium; and
   sending a management message via the communications medium to indicate the RIFS.

4. The method of claim 2, wherein the RIFS is reduced in response to a determination that the channel quality is above a quality threshold.

5. The method of claim 1, wherein the processing time associated with processing the final modulation symbol is based, at least in part, on a number of iterations of decoding that will be performed for each FEC encoded block that ends in the final modulation symbol.

6. The method of claim 5, further comprising:
   determining the number of iterations of decoding that will be performed for each FEC encoded block that ends in the final modulation symbol based, at least in part, on a previous number of iterations of decoding preformed for previous FEC encoded blocks in an earlier modulation symbol.

7. The method of claim 5, wherein the number of iterations of decoding that will be performed for each FEC encoded block is based, at least in part, on channel quality associated with the communications medium.

8. The method of claim 5, wherein the number of iterations of decoding that will be performed for each FEC encoded block that ends in the final modulation symbol is based, at least in part, on a forward error correction coding scheme used to encode each FEC encoded block that ends in the final modulation symbol.

9. The method of claim 1, wherein the RIFS time period is based, at least in part, on an acknowledgement generation time period associated with preparing the acknowledgment message.

10. The method of claim 9, further comprising:
    generating the acknowledgment message, the acknowledgment message comprising a compressed acknowledgment bitmap for multiple FEC encoded blocks,
    wherein the acknowledgement generation time period is based, at least in part, on a compression scheme used to prepare the compressed acknowledgment bitmap.

11. The method of claim 1, further comprising:
    determining the RIFS time period prior to receiving the PPDU.

12. The method of claim 11, further comprising:
    sending a configuration message to a transmitting device, wherein the configuration message indicates the determined RIFS time period.

13. The method of claim 12, wherein the configuration message comprises a management message or a tone map message.

14. The method of claim 1, wherein the acknowledgment message is a selective acknowledgment (SACK) message that indicates which ones of one or more FEC encoded blocks in the PPDU were properly decoded.

15. The method of claim 1, wherein the communications medium is one of the group consisting of a wireless communications channel, a power line communications medium, and a mobile telecommunications wireless medium.

16. The method of claim 1, wherein the series of modulation symbols comprises orthogonal frequency division multiplexing (OFDM) symbols.

17. An apparatus comprising:
    a processor; and
    memory for storing instructions which, when executed by the processor, cause the apparatus to:
       receive, via a communications medium, a physical layer (PHY) protocol data unit (PPDU) that includes multiple forward error correction (FEC) encoded blocks, the PPDU received as a series of modulation symbols;
       select a response interframe space (RIFS) based, at least in part on a processing time associated with processing a final modulation symbol of the PPDU, the RIFS defining a RIFS time period after the final modulation symbol of the PPDU is received and before sending an acknowledgment message in response to receipt of the PPDU; and send, via the communication medium, the acknowledgment message after the RIFS time period associated with the RIFS.

18. The apparatus of claim 17, wherein the processing time associated with processing the final modulation symbol is based, at least in part, on channel quality associated with the communications medium.

19. The apparatus of claim 18, wherein the instructions, when executed by the processor, further cause the apparatus to:

determine the channel quality of the communications medium based, at least in part, on a prior transmission earlier than the PPDU;

estimate the processing time associated with processing the final modulation symbol of the PPDU based, at least in part, on the channel quality of the communications medium; and send a management message via the communications medium to indicate the RIFS.

20. The apparatus of claim 17, wherein the processing time associated with processing the final modulation symbol is based, at least in part, on a number of iterations of decoding that will be performed for each FEC encoded block that ends in the final modulation symbol.

21. The apparatus of claim 20, wherein the instructions, when executed by the processor, further cause the apparatus to determine the number of iterations of decoding that will be performed for each FEC encoded block that ends in the final modulation symbol based, at least in part, on a previous number of iterations of decoding preformed for previous FEC encoded blocks in an earlier modulation symbol.

22. The apparatus of claim 20, wherein the number of iterations of decoding that will be performed for each FEC encoded block that ends in the final modulation symbol is based, at least in part, on a forward error correction coding scheme used to encode each FEC encoded block that ends in the final modulation symbol.

23. The apparatus of claim 17, wherein the instructions, when executed by the processor, further cause the apparatus to:

prepare the acknowledgment message, wherein the RIFS time period is based, at least in part, on an acknowledgement generation time period associated with preparing the acknowledgment message.

24. A non-transitory computer readable medium storing instructions which, when executed by one or more processors of a device, cause the device to:

receive, via a communications medium, a physical layer (PHY) protocol data unit (PPDU) that includes multiple forward error correction (FEC) encoded blocks, the PPDU received as a series of modulation symbols;

select a response interframe space (RIFS) based, at least in part on a processing time associated with processing a final modulation symbol of the PPDU, the RIFS defining a RIFS time period after the final modulation symbol of the PPDU is received and before sending an acknowledgment message in response to receipt of the PPDU; and send the acknowledgment message after the RIFS time period associated with the RIFS.

25. The non-transitory computer readable medium of claim 24, storing further instructions which, when executed by the one or more processors of the device, cause the device to:

prior to receiving the PPDU, determine a channel quality of the communications medium based, at least in part, on a prior transmission earlier than the PPDU;

estimate the processing time associated with processing the final modulation symbol of the PPDU based, at least in part, on the channel quality of the communications medium; and send a management message via the communications medium to indicate the RIFS.

26. The non-transitory computer readable medium of claim 24, wherein the processing time associated with processing the final modulation symbol is based, at least in part, on a number of iterations of decoding that will be performed for each FEC encoded block that ends in the final modulation symbol.

27. The non-transitory computer readable medium of claim 26, storing further instructions which, when executed by the one or more processors of the device, cause the device to:

determine the number of iterations of decoding that will be performed for each FEC encoded block that ends in the final modulation symbol based, at least in part, on a previous number of iterations of decoding preformed for previous FEC encoded blocks in an earlier modulation symbol.

28. The non-transitory computer readable medium of claim 24, wherein the RIFS time period is based, at least in part, on an acknowledgement generation time period associated with preparing the acknowledgment message, and wherein the instructions, when executed by the one or more processors of the device, cause the device to:

generate the acknowledgment message, the acknowledgment message comprising a compressed acknowledgment bitmap for multiple FEC encoded blocks, wherein the acknowledgement generation time period is based, at least in part, on a compression scheme used to prepare the compressed acknowledgment bitmap.

29. A communications device comprising:

means for receiving, via a communications medium, a physical layer (PHY) protocol data unit (PPDU) that includes multiple forward error correction (FEC) encoded blocks, the PPDU received as a series of modulation symbols;

means for selecting a response interframe space (RIFS) based, at least in part, on a processing time associated with processing a final modulation symbol of the PPDU, the RIFS defining a RIFS time period after the final modulation symbol of the PPDU is received and before sending an acknowledgment message in response to receipt of the PPDU; and means for sending the acknowledgment message after the RIFS time period associated with the RIFS.

30. The communications device of claim 29, further comprising:

means for determining a channel quality of the communications medium based, at least in part, on a prior transmission earlier than the PPDU;

means for estimating the processing time associated with processing the final modulation symbol of the PPDU based, at least in part, on the channel quality of the communications medium; and means for sending a management message via the communications medium to indicate the RIFS.

* * * * *